(12) United States Patent
Koyanagi

(10) Patent No.: US 11,393,448 B2
(45) Date of Patent: Jul. 19, 2022

(54) WIRELESS TERMINAL, SERVER, COMMUNICATIONS METHOD FOR WIRELESS TERMINAL, AND RECORDING MEDIUM FOR FURTHER ENHANCING VOICE SYNTHESIS IN A MOBILE COMMUNICATION SYSTEM

(71) Applicant: NEC CORPORATION, Tokyo (JP)

(72) Inventor: Kenji Koyanagi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 401 days.

(21) Appl. No.: 16/481,130

(22) PCT Filed: Jan. 22, 2018

(86) PCT No.: PCT/JP2018/001827
§ 371 (c)(1),
(2) Date: Jul. 26, 2019

(87) PCT Pub. No.: WO2018/139409
PCT Pub. Date: Aug. 2, 2018

(65) Prior Publication Data
US 2021/0142781 A1    May 13, 2021

(30) Foreign Application Priority Data

Jan. 27, 2017  (JP) .............................. JP2017-013128

(51) Int. Cl.
*G10L 13/033* (2013.01)
*H04M 1/60* (2006.01)
*H04W 4/08* (2009.01)

(52) U.S. Cl.
CPC ............. *G10L 13/033* (2013.01); *H04M 1/60* (2013.01); *H04W 4/08* (2013.01)

(58) Field of Classification Search
CPC ........... H04W 4/06; H04W 4/08; H04W 4/10; H04W 76/40; H04W 72/005;
(Continued)

(56) References Cited

U.S. PATENT DOCUMENTS

| | | | |
|---|---|---|---|
| 7,006,616 B1 * | 2/2006 | Christofferson | H04L 65/104 379/202.01 |
| 9,491,237 B1 * | 11/2016 | Garg | H04W 4/021 |
| 2003/0112947 A1 | 6/2003 | Cohen | |
| 2014/0228011 A1 * | 8/2014 | Goel | H04L 65/4061 455/416 |
| 2016/0164658 A1 * | 6/2016 | Fraser | H04W 76/30 370/280 |

FOREIGN PATENT DOCUMENTS

JP    2003-500935 A    1/2003
JP    2006-148816 A    6/2006
(Continued)

OTHER PUBLICATIONS

International Search Report of PCT/JP2018/001827 dated Apr. 10, 2018 [PCT/ISA/210].
Written Opinion of PCT/JP2018/001827 dated Apr. 10, 2018 [PCT/ISA/237].

*Primary Examiner* — Golam Sorowar
(74) *Attorney, Agent, or Firm* — Sughrue Mion, PLLC

(57) ABSTRACT

In order to provide a new mechanism relating to further enhanced voice synthesis, a wireless terminal includes a receiver and a transmitter. The receiver is configured to be capable of receiving, when the wireless terminal is included in at least one group, a voice communication relating to the at least one group. The transmitter is configured to transmit, to a communication device that controls the voice communication relating to the at least one group, volume information for determining volume on the voice communication relating to the at least one group.

15 Claims, 23 Drawing Sheets

(58) Field of Classification Search
CPC ....... H04W 76/45; H04W 76/14; H04W 4/70; H04W 8/186; H04W 8/005; H04W 4/023; H04W 4/021; H04W 4/90; H04W 88/02; H04W 88/04; H04W 4/02; H04W 68/02; H04W 36/0009; H04W 36/14; H04W 4/80; H04L 12/189; H04L 12/1822; H04L 65/403; H04L 65/1069; H04L 65/4061; H04L 65/1016; H04L 65/1063; H04L 65/4038; H04L 65/4076; H04L 65/1073; H04L 65/605; H04L 65/80; H04L 67/14; H04L 12/1407; H04L 12/185; H04L 65/604; H04L 67/16; H04L 12/18; H04L 2001/0093; H04L 41/02; H04M 15/57; H04M 15/66; H04M 3/566; H04M 3/567; H04M 15/63; H04M 3/42348; H04M 13/00; H04M 3/42221; H04M 3/56; H04M 3/569

See application file for complete search history.

(56) References Cited

FOREIGN PATENT DOCUMENTS

| | | |
|---|---|---|
| JP | 2006-237864 A | 9/2006 |
| JP | 2008-288974 A | 11/2008 |
| JP | 2010-056634 A | 3/2010 |
| JP | 2011-188369 A | 9/2011 |

\* cited by examiner

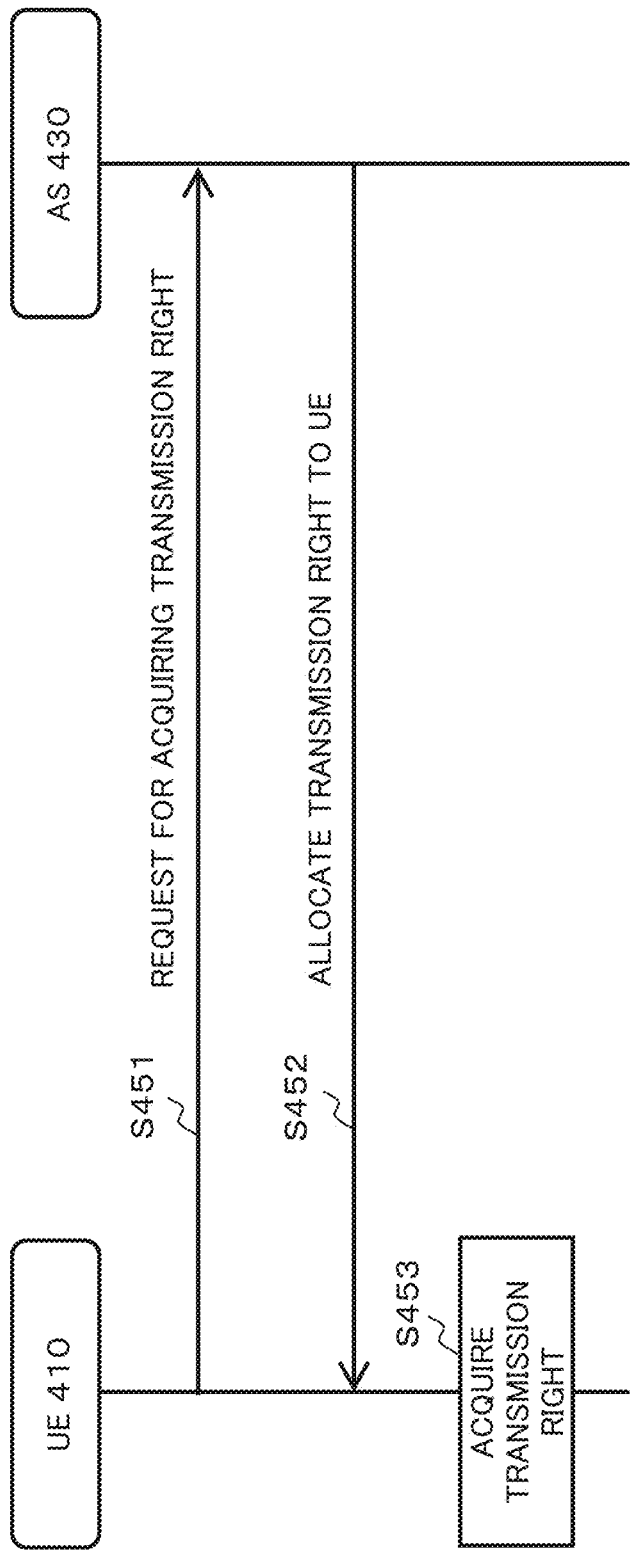

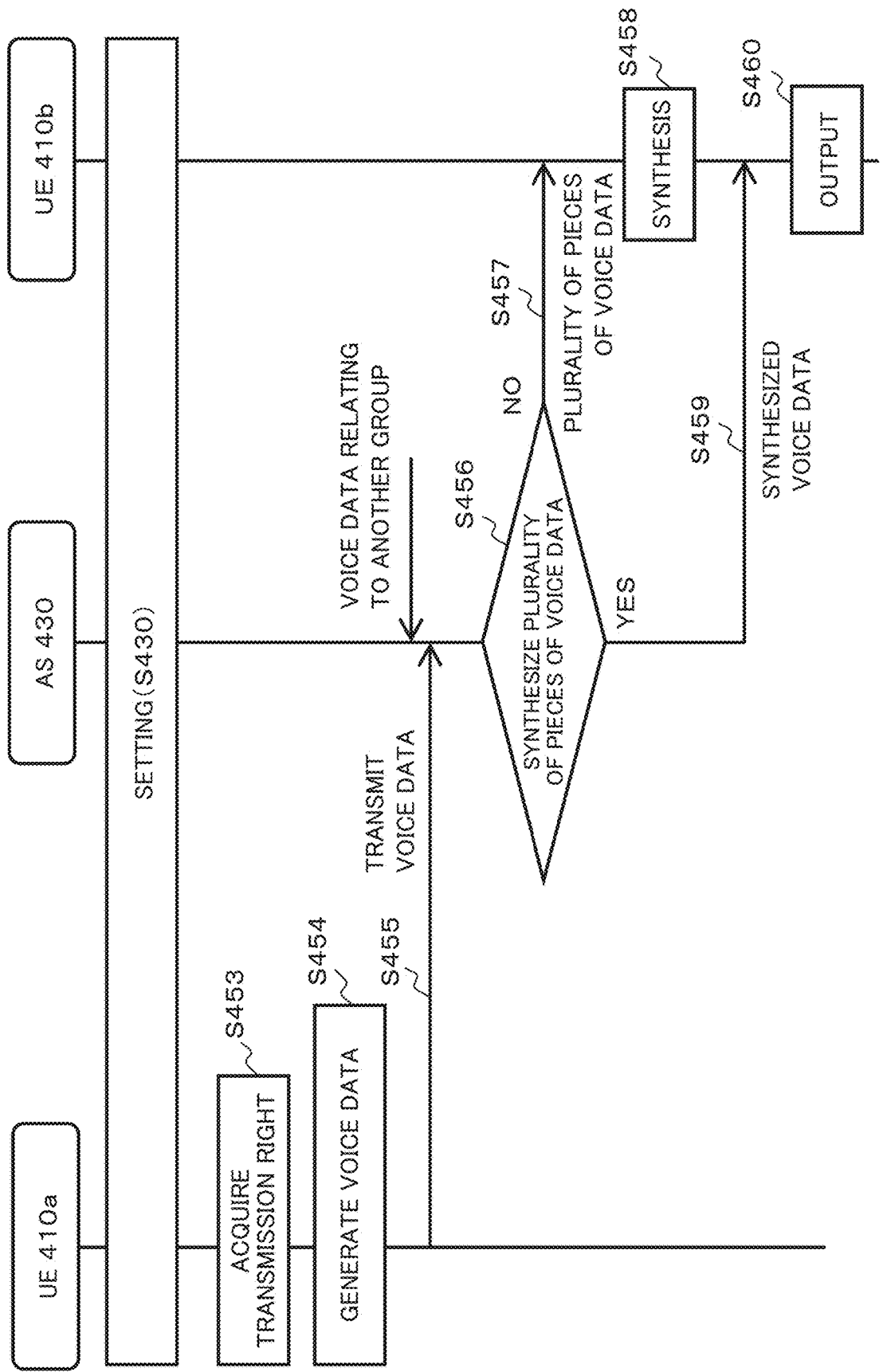

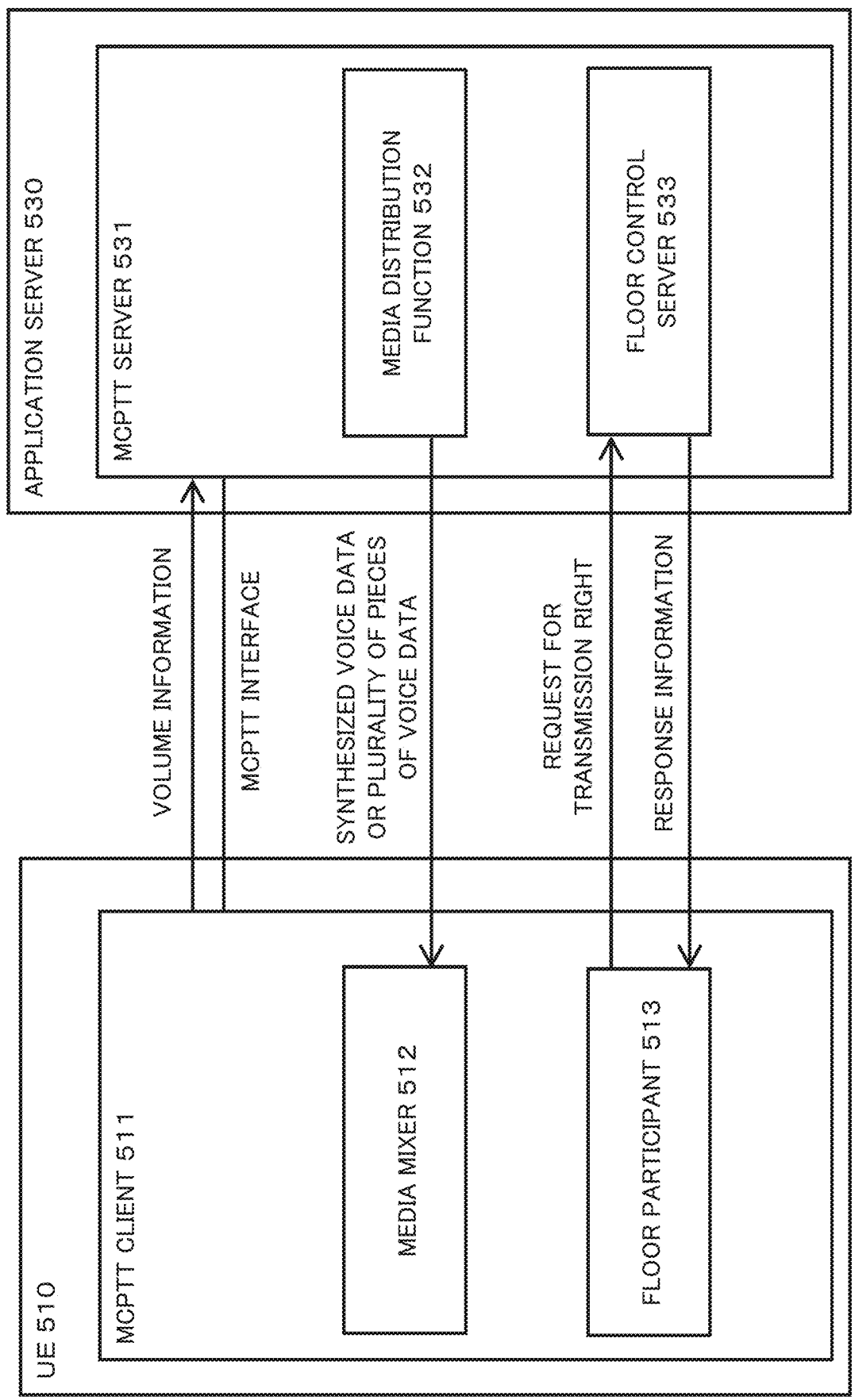

WIRELESS TERMINAL, SERVER, COMMUNICATIONS METHOD FOR WIRELESS TERMINAL, AND RECORDING MEDIUM FOR FURTHER ENHANCING VOICE SYNTHESIS IN A MOBILE COMMUNICATION SYSTEM

CROSS REFERENCE TO RELATED APPLICATIONS

This application is a National Stage of International Application No. PCT/JP2018/001827, filed Jan. 22, 2018, claiming priority based on Japanese Patent Application No. 2017-013128, filed Jan. 27, 2017, the contents of all of which are incorporated herein by reference in their entirety.

TECHNICAL FIELD

The present disclosure relates to a wireless terminal, a server, a communications method for the wireless terminal, and a recording medium.

BACKGROUND ART

PTL 1 relates to a video conference system for performing a data communication between video conference devices present at multiple points. In the video conference system, there is one video conference device serving as a master terminal for the entire video conference system, and the master terminal collectively controls transmission of a moving image and a voice to a slave terminal participating in a video conference. The master terminal receives voice signals from a plurality of slave terminals, and synthesizes the respective voice signals. The synthesized voice signals are transmitted to the slave terminals.

CITATION LIST

Patent Literature

[PTL 1] Japanese Unexamined Patent Application Publication No. 2008-288974

SUMMARY OF INVENTION

Technical Problem

PTL 1 merely discloses that a master terminal synthesizes a plurality of voices and transmits the synthesized voices to a slave terminal. PTL 1 does not specifically disclose or suggest, for example, synthesis of voices in a slave terminal, or exchange of information relating to voice synthesis between a master terminal and a slave terminal.

Therefore, an exemplary example embodiment has been proposed for solving the above-described problem in the Background Art, and an object thereof is to provide a new mechanism relating to further enhanced voice synthesis.

Solution to Problem

A wireless terminal according to an exemplary example embodiment includes a receiver and a transmitter. The receiver is configured to be capable of receiving, when the wireless terminal is included in at least one group, a voice communication relating to the at least one group. The transmitter is configured to transmit, to a communication device that controls the voice communication relating to the at least one group, volume information for determining volume on the voice communication relating to the at least one group.

A server according to another exemplary example embodiment includes a receiver and a processor. The receiver is configured to receive volume information for determining volume on a voice communication relating to at least one group. The processor is configured to determine volume, based on the volume information, and synthesize a voice of the voice communication relating to the at least one group, based on the determined volume.

A communications method for a wireless terminal according to another exemplary example embodiment includes transmitting, when the wireless terminal is included in at least one group, volume information for determining volume on the voice communication relating to the at least one group, to a communication device that controls the voice communication relating to the at least one group. Further, the communications method includes receiving the voice communication relating to the at least one group.

A program recorded on a computer-readable recording medium of a wireless terminal according to another exemplary example embodiment causes a computer to execute transmitting, when a wireless terminal is included in at least one group, volume information for determining volume on the voice communication relating to the at least one group, to a communication device that controls the voice communication relating to the at least one group, and receiving the voice communication relating to the at least one group.

Advantageous Effects of Invention

According to an exemplary example embodiment, it is possible to provide a new mechanism relating to further enhanced voice synthesis.

BRIEF DESCRIPTION OF DRAWINGS

FIG. 22 shows operation 2 according to the fourth exemplary example embodiment.

FIG. 23 shows operation 3 according to the fourth exemplary example embodiment.

FIG. 24 shows one example of a mobile communication system according to a fifth exemplary example embodiment.

EXAMPLE EMBODIMENT

In the following, exemplary example embodiments will be described in detail with reference to the drawings. In each drawing, identical reference signs are assigned to identical or corresponding elements, and overlapping parts will be omitted as needed for simplification of illustration. A plurality of exemplary example embodiments to be described below may be implemented independently, or may be implemented in combination as appropriate.

Further, in the present description and the drawings, a plurality of components having a substantially identical function configuration may be sometimes distinguished by assigning different alphabets to the end of an identical reference sign. For example, a plurality of configurations having a substantially identical function configuration will be distinguished as needed, like mobile stations 10a, 10b, and 10c. However, when it is not particularly necessary to distinguish a plurality of respective components having a substantially identical function configuration, only an identical reference sign will be assigned. For example, when it is not particularly necessary to distinguish the mobile stations 10a, 10b, and 10c, the mobile stations 10a, 10b, and 10c will be simply referred to as a mobile station 10.

Introduction

Figure 1:
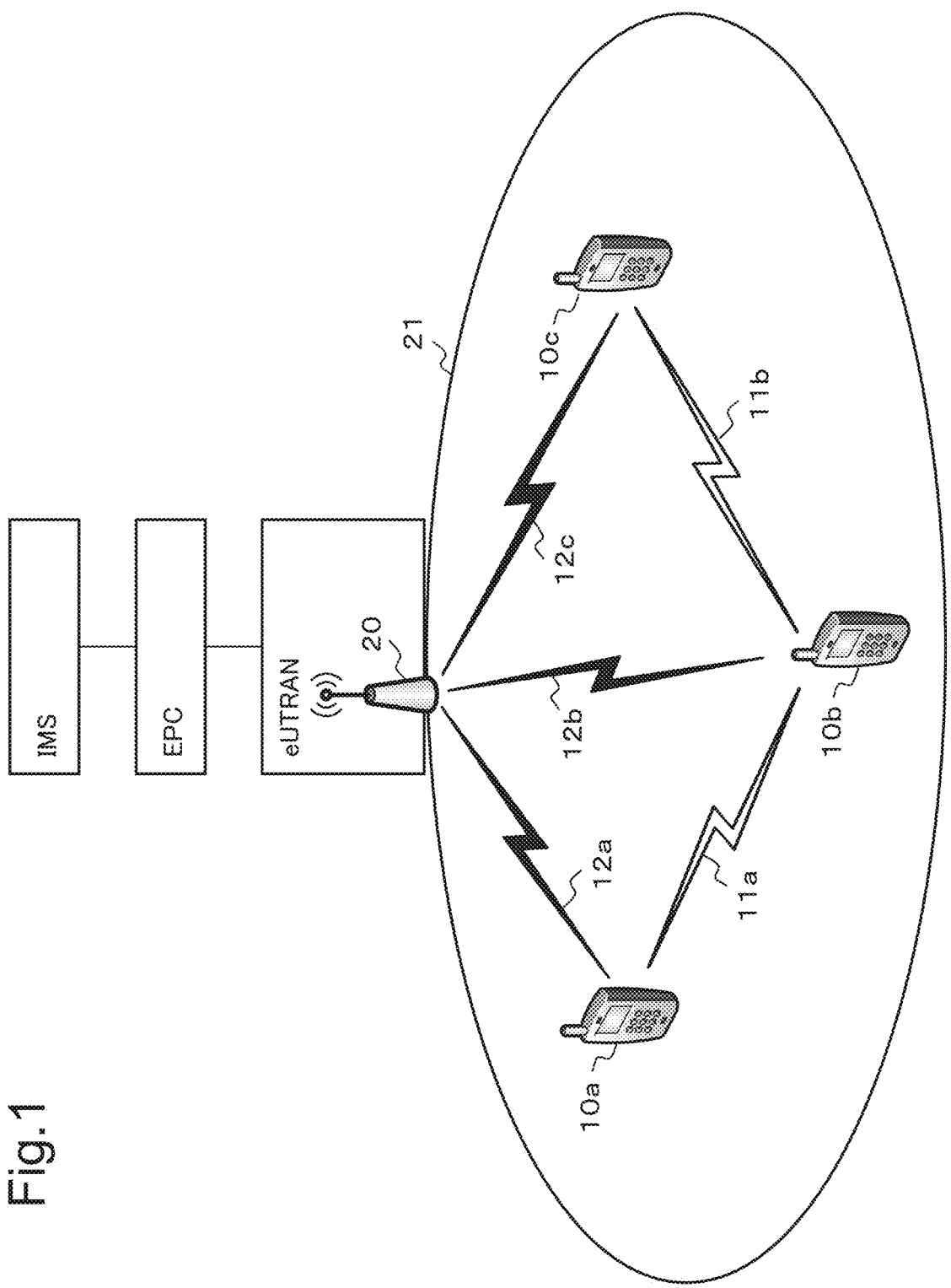
FIG. 1 shows a mobile communication system according to an exemplary example embodiment.

FIG. 1 illustrates a mobile communication system according to an exemplary example embodiment.

In FIG. 1, the mobile communication system includes an internet protocol (IP) multimedia subsystem (IMS), an evolved packet core (EPC), an evolved universal terrestrial radio access network (eUTRAN), and a mobile station 10.

The IMS is a system implementing a multimedia service with an IP-based core network.

The EPC is a core network in long term evolution (LTE).

The eUTRAN is a wireless access network in LTE. The eUTRAN is constituted by a base station (evolved node B (eNB)).

A base station 20 forms a cell 21. The base station 20 communicates with at least one mobile station 10 in the cell 21. In FIG. 1, the base station 20 executes a wireless communication 12a with a mobile station 10a. The base station 20 executes a wireless communication 12b with a mobile station 10b. The base station 20 executes a wireless communication 12c with a mobile station 10c.

The mobile station 10 is configured to be capable of executing a wireless communication 12 with the base station 20. Further, the mobile station 10 is configured to be capable of executing a direct communication 11 between two mobile stations 10. In FIG. 1, the mobile station 10a executes a direct communication 11a with the mobile station 10b. The mobile station 10b executes a direct communication 11b with the mobile station 10c. Note that the mobile station 10 may also constitute a multi-hop wireless network enabling not only the direct communication 11 but also a communication with the mobile station 10 in a broader range via another mobile station 10. For example, the mobile station 10a is able to communicate with the mobile station 10c through the mobile station 10b (that is, by using the direct communication 11a and the direct communication 11b). The technique may be a direct wave communication using a dedicated wireless device, commercial LTE-Direct, LTE proximity-based services (ProSe), and LTE-device to device (D2D). For example, these techniques are used in a public safety wireless system, in order to provide a communication means even in a situation where an eNB goes down due to a large-scale disaster or the like.

Figure 2:
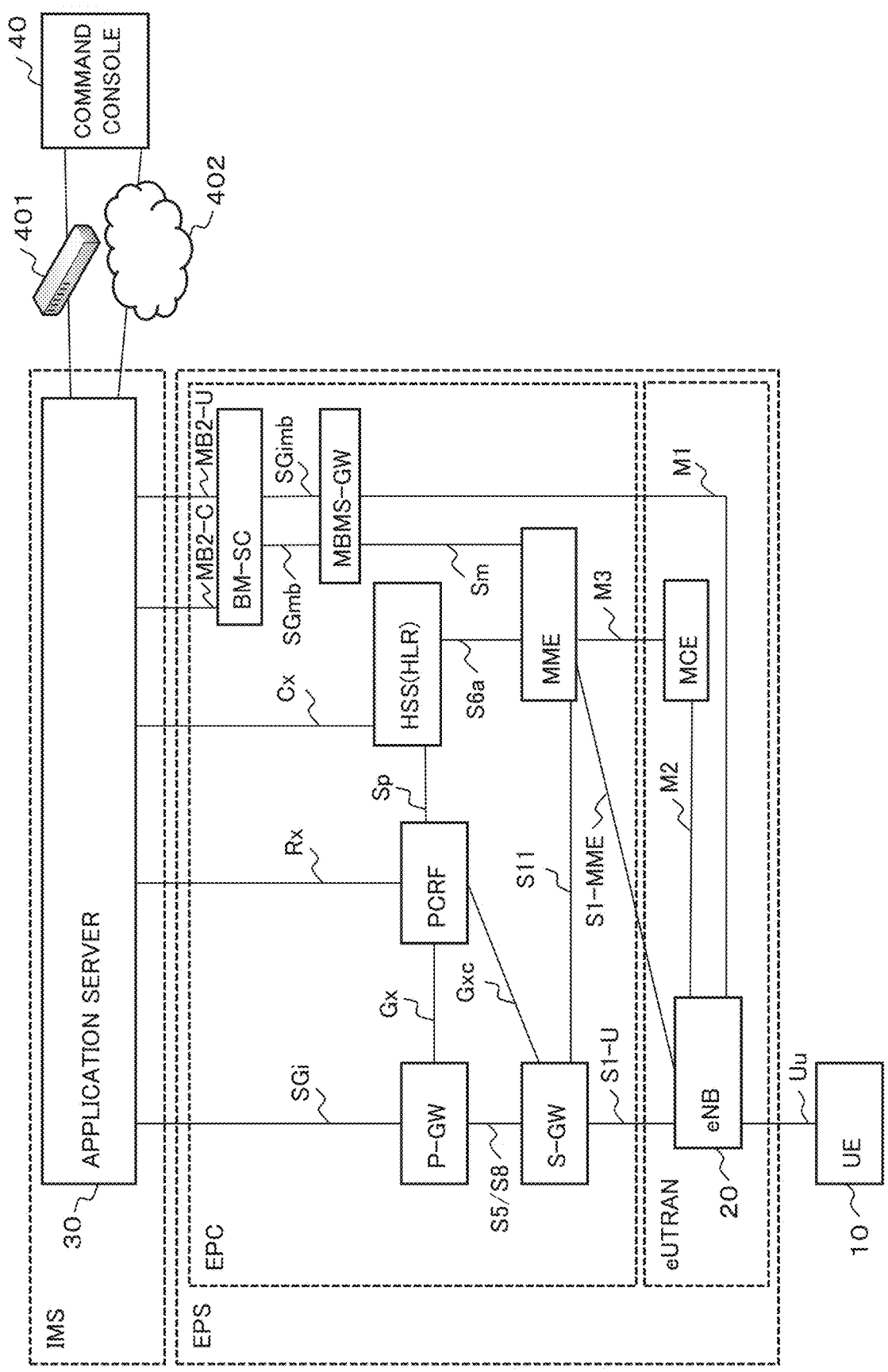
FIG. 2 shows one example of a mobile communication system according to an exemplary example embodiment.

FIG. 2 illustrates one example of a mobile communication system according to an exemplary example embodiment.

An IMS includes an application server (application server 30).

An EPC and an eUTRAN constitute an evolved packet system (EPS).

The EPC includes a packet data network gateway (P-GW), a serving gateway (S-GW), a mobility management entity (MME), a policy and charging rules function (PCRF), a home subscriber server (HSS), a broadcast multicast service center (BM-SC), and a multimedia broadcast multicast services gateway (MBMS-GW).

The eUTRAN includes an eNB and a multi-cell/multicast coordination entity (MCE).

The application server (application server 30) manages an individual communication and a group communication. Note that the application server 30 or another functional entity (for example, a session initiation protocol (SIP) server) in the IMS has a function of basic voice calling/call receiving, and performs voice session control.

The P-GW allocates an IP address to a terminal, and accommodates wireless access. Further, the P-GW is used for connecting to an external network such as the Internet.

The S-GW deals with user plane (U-plane) being packet data of user data.

The MME performs mobility control such as establishment and/or release of a bearer being a connection between a user (mobile station) and a packet network, location registration, and handover. The MME deals with control plane (C-plane) for network control.

The PCRF manages policy information and the like to be applied to a packet, according to contract information of a user and an application used by the user.

The HSS (or a home location register (HLR)) is a database that manages user information (information on a mobile station). For example, the HSS manages authentication information and in-cell information on a user. For example, the HSS stores current location information of a terminal.

The BM-SC is a network node that stores a content to be transmitted by MBMS and controls MBMS transmission.

The MBMS-GW transmits MBMS data to be distributed from the BM-SC, to a target eNB by IP multicast.

The MCE designates a transmission radio resource and synchronizes a content between eNBs. For example, a radio resource to be transmitted is designated and a content is synchronized between eNBs constituting a multicast broadcast single frequency network (MBSFN).

Herein, an interface between the respective devices or the respective functional entities will be described.

An S1-U interface is an interface between the S-GW and the eNB.

An S1-MME interface is an interface between the MME and the eNB.

An S5/S8 interface is an interface between the P-GW and the S-GW.

An S6a interface is an interface between the MME and the HSS.

An S11 interface is an interface between the S-GW and the MME.

An Sm interface is an interface between the MME and the MBMS-GW.

An SGmb interface is an interface between the MBMS-GW and the BM-SC.

An SGimb interface is an interface between the MBMS-GW and the BM-SC.

An SGi interface is an interface between the application server 30 and the P-GW.

An Sp interface is an interface between the PCRF and the HSS.

A Uu interface is an interface between the eNB and the mobile station.

A Gx interface is an interface between the P-GW and the PCRF.

A Gxc interface is an interface between the S-GW and the PCRF.

An M1 interface is an interface between the eNB and the MBMS-GW.

An M2 interface is an interface between the eNB and the MCE.

An M3 interface is an interface between the MCE and the MME.

An Rx interface is an interface between the PCRF and the application server.

A Cx interface is an interface between the HSS and the application server.

An MB2-C interface is an interface between the BM-SC and the application server.

An MB2-U interface is an interface between the BM-SC and the application server.

Note that, in FIG. 2, a command console 40 may be connected with the application server 30 through an internet network 402 or a switch 401. For example, in the case of a firefighting and ambulance wireless system that transmits and receives information among a firefighting command center, a firefighting team, and an ambulance team, the command console 40 is installed in the firefighting command center. In this case, a mobile station (user equipment (UE)) is installed in a vehicle of the firefighting team or the ambulance team.

Note that a function of the command console 40 may be provided for the mobile station 10, and the mobile station 10 may operate as a command console. In this case, the mobile station 10 having a function of the command console 40 may not be directly connected with the application server 30 through the switch 401 or the internet network 402 as in FIG. 2. Similarly to the normal mobile station 10 (UE), a UE operating as a command console can be connected with the application server 30 via the eUTRAN and the EPC.

In the exemplary example embodiment, the mobile station 10 is able to execute an individual communication with another communication device, or a group communication with a group composed of a plurality of communication devices.

Figure 3:
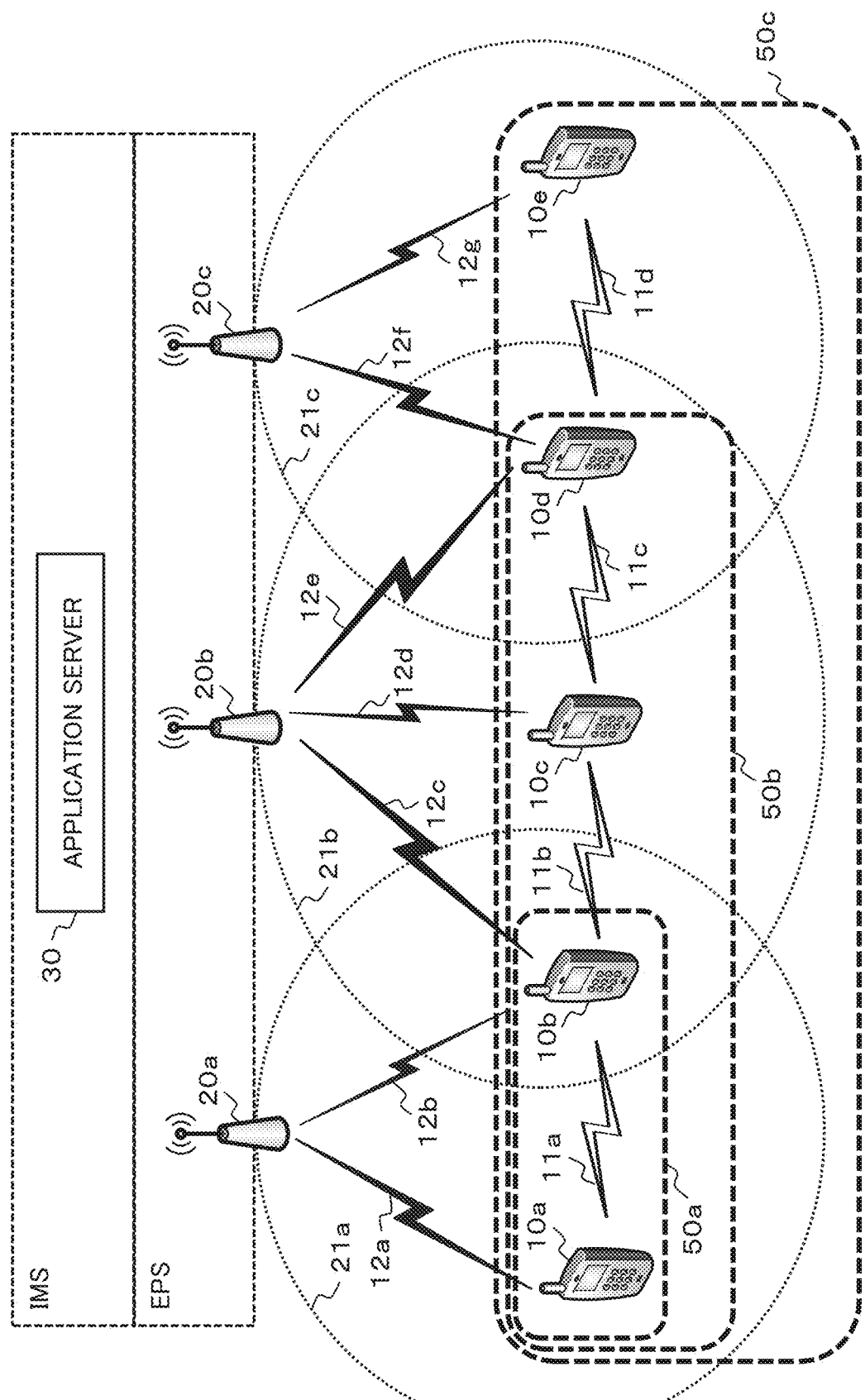
FIG. 3 shows one example of a group communication according to an exemplary example embodiment.

FIG. 3 illustrates one example of a group communication according to an exemplary example embodiment.

An EPS in FIG. 3 is similar to the configuration in FIG. 2. For simplification of illustration, most of configurations in the EPS in FIG. 3 are omitted.

In the example in FIG. 3, an IMS includes one application server 30. An eUTRAN in the EPS is constituted by a base station 20a, a base station 20b, and a base station 20c. The base station 20a forms a cell 21a. The base station 20b forms a cell 21b. The base station 20c forms a cell 21c.

In the present example, a group 50a is composed of mobile stations 10a and 10b. A group 50b is composed of the mobile station 10a, the mobile station 10b, a mobile station 10c, and a mobile station 10d. A group 50c is composed of the mobile station 10a, the mobile station 10b, the mobile station 10c, the mobile station 10d, and a mobile station 10e. As described above, a group 50 can cover a range of a plurality of cells rather than a single cell.

For example, the respective mobile stations 10 composing the group 50c are configured to be capable of performing a communication within the group (group communication).

The group communication includes, for example, an inter-network communication in which data from a mobile station 10 are transmitted to another mobile station 10 via a base station 20, and a direct communication in which data are transmitted from a mobile station 10 directly to another mobile station 10 without via a network.

For example, the mobile station 10a is able to execute a group communication with the mobile station 10b via the base station 20a, by using a wireless communication 12a and a wireless communication 12b.

Further, the mobile station 10a is able to execute a group communication in the group 50a, by performing a direct communication 11a with the mobile station 10b.

Further, the mobile station 10a is able to execute a group communication with the mobile station 10c in the group 50b via the base station 20a and the base station 20b, by using the wireless communication 12a and a wireless communication 12d.

Further, the mobile station 10a is able to execute a group communication with the mobile station 10e in the group 50c via the base station 20a and the base station 20c, by using the wireless communication 12a and a wireless communication 12g.

Further, the mobile station 10a is able to execute a group communication (multi-hop communication) in the group 50b, by performing the direct communication 11a with the mobile station 10b and performing a direct communication 11b with the mobile station 10c.

Further, the mobile station 10a is able to execute a group communication in the group 50c, by performing the direct communication 11a with the mobile station 10b, performing the direct communication 11b with the mobile station 10c, performing a direct communication 11c with the mobile station 10d, and performing a direct communication 11d with the mobile station 10e.

Note that the group communication using the inter-network communication may be transmitted to another base station 20 via an interface (for example, an X2 interface) between the base stations 20. Further, the group communication using the inter-network communication may be transmitted to another base station 20 via the base station 20 and the EPS (or the EPC). Further, the group communication using the inter-network communication may be transmitted to another base station 20 via the base station 20, the EPS (or the EPC), and the IMS.

The application server 30 manages a relationship between each mobile station 10 and a group. The function of managing a group may be provided for the application server 30, or may be provided for communication devices composing the group. For example, the function of the application server 30 may be installed as software of the mobile stations 10 composing a group, and the function of group management may be implemented by the mobile stations 10 in which the function is installed. In a group that is managed by the application server 30 or communication devices having a function equivalent to the application server 30, a communication path (also referred to as a bearer, a session, or a connection) is constructed between the mobile stations 10 composing the group. The application server 30 may further determine that data to be transmitted within a group are unicasted, multicasted, or broadcasted.

Herein, types of a group communication will be described.

(When a group communication is made via the application server 30)

The application server 30 receives data (for example, voice data or streaming data) from a communication device such as the command console 40. The application server 30 determines to which group the received data have to be transmitted, and transmits the data to the determined group. The transmitted data are transmitted to the mobile station 10 included in the destination group via the EPS.

Further, when the mobile station 10 transmits data within a group, for example, the mobile station 10 transmits data to the application server 30 via the EPS. The application server 30 determines to which group the received data have to be transmitted, and transmits the data to the determined group. The transmitted data are transmitted to the mobile station 10 included in the destination group via the EPS.

(When a group communication is made without via the application server 30)

When the mobile station 10 transmits data within a group, the mobile station 10 performs a direct communication 11 with another mobile station 10 included in the group. The transmission data transmitted by the mobile station 10 are led to the mobile station 10 belonging to the group, by performing a multi-hop communication as needed.

Figure 4:
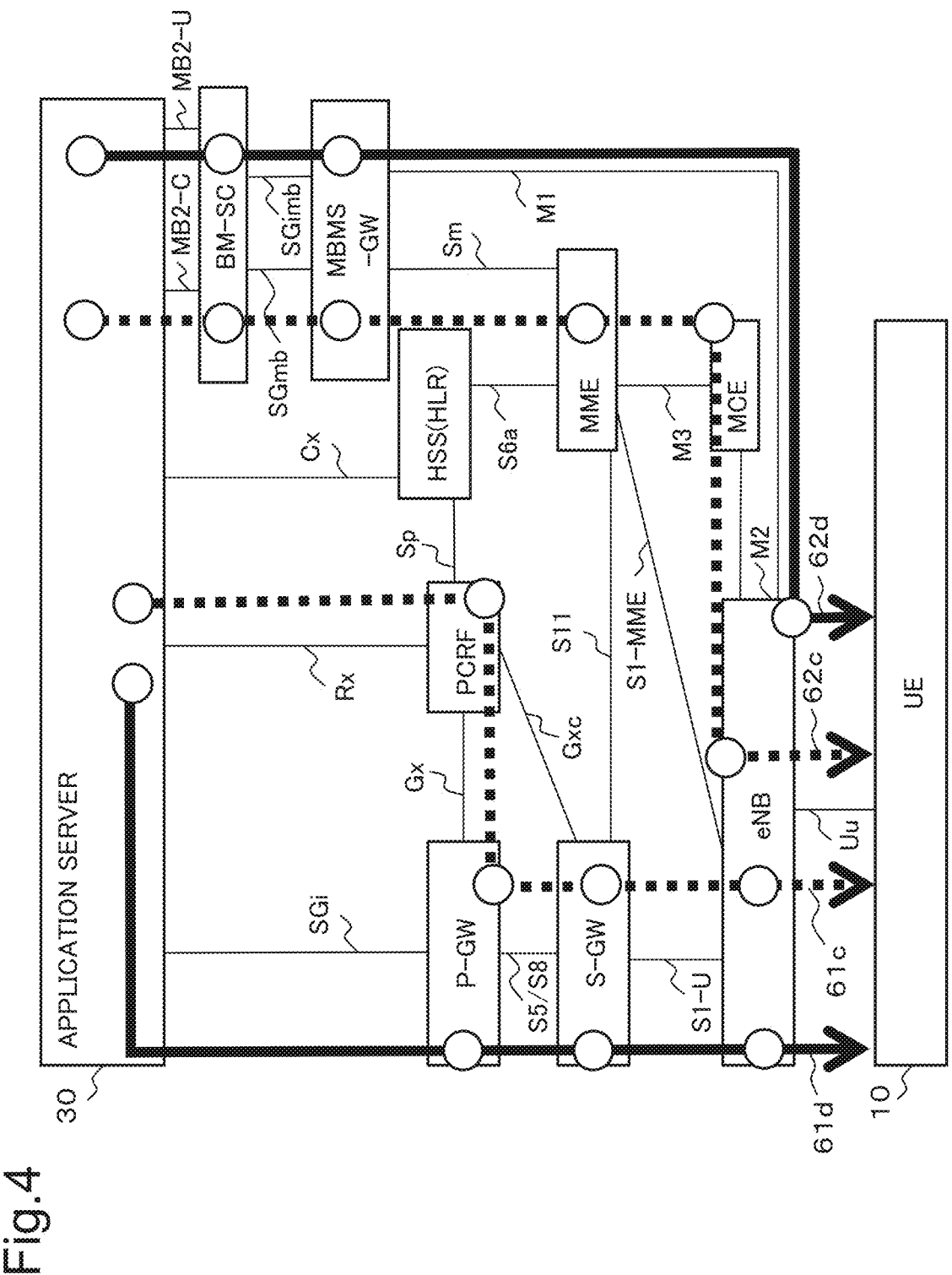
FIG. 4 shows one example of a bearer according to an exemplary example embodiment.

FIG. 4 illustrates one example of a communication path (bearer) according to an exemplary example embodiment.

Two types of communication paths (bearers) are used for an individual communication or the group communication described above.

In the example in FIG. 4, an example is illustrated in which data to be transmitted from the application server 30 to the mobile station 10 are transmitted through two types of communication paths. The two types of communication paths are called a unicast bearer 61 and a multicast bearer 62 for convenience. A symbol "circle" in FIG. 4 indicates a via point.

The unicast bearer 61 includes a unicast bearer 61*d* and a unicast bearer 61*c*. In the unicast bearer 61*d*, a data signal is transmitted. In the unicast bearer 61*c*, a control signal is transmitted.

The multicast bearer 62 includes a multicast bearer 62*d* and a multicast bearer 62*c*. In the multicast bearer 62*d*, a data signal is transmitted. In the multicast bearer 62*c*, a control signal is transmitted.

The unicast bearer 61*d* is a communication path from the application server 30 to the mobile station 10 via the P-GW, the S-GW, and the eNB.

The unicast bearer 61*c* is a communication path from the application server 30 to the mobile station 10 via the PCRF, the P-GW, the S-GW, and the eNB.

The multicast bearer 62*d* is a communication path from the application server 30 to the mobile station 10 via the BM-SC, the MBMS-GW, and the eNB.

The multicast bearer 62*c* is a communication path from the application server 30 to the mobile station 10 via the BM-SC, the MBMS-GW, the MME, the MCE, and the eNB.

Figure 5:
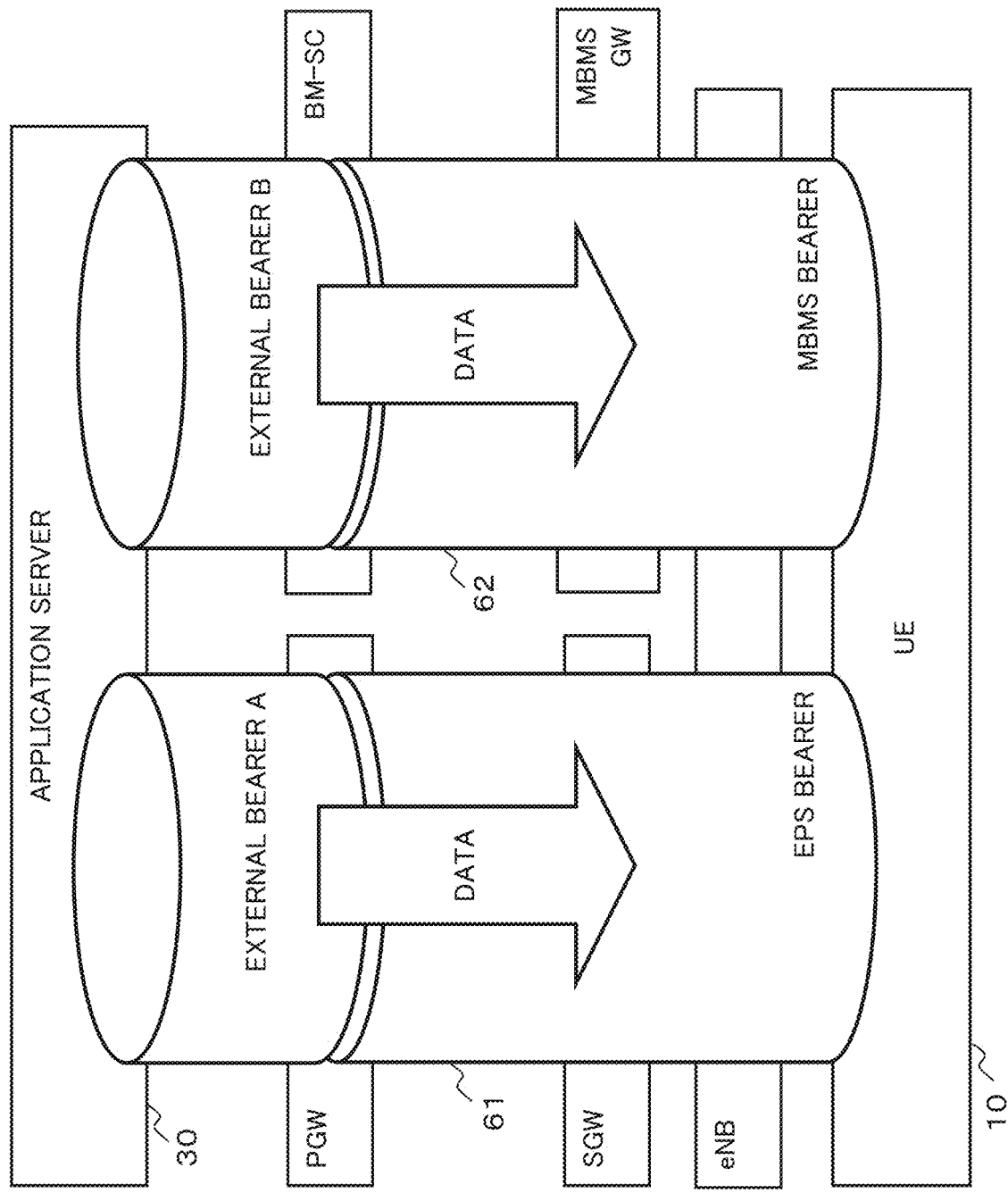
FIG. 5 shows one example of a bearer according to an exemplary example embodiment.

FIG. 5 illustrates one example of the bearer according to an exemplary example embodiment.

FIG. 5 is a diagram simplistically illustrating a bearer (a communication path or a communication resource) in FIG. 4.

The unicast bearer 61 is constituted by an EPS bearer and an external bearer A. Data between the application server 30 and the mobile station 10 are transmitted through a communication path constituted by the EPS bearer and the external bearer A (in the example in FIG. 5, a downlink communication is illustrated). Specifically, a service between the application server 30 and the mobile station 10 are provided by the EPS bearer connected with the external bearer A by the P-GW. The EPS bearer is provided by an S5/S8 bearer connected with an E-UTRAN radio access bearer (E-RAB) by the S-GW. The E-RAB is provided by an S1 bearer connected with a radio bearer by the eNB.

The multicast bearer 62 is constituted by an MBMS bearer and an external bearer B. Data between the application server 30 and the mobile station 10 are transmitted through a communication path constituted by the MBMS bearer and the external bearer B (in the example in FIG. 5, a downlink communication is illustrated).

In an individual communication, the unicast bearer 61 is used.

In a group communication, at least one of the unicast bearer 61 and the multicast bearer 62 is used.

For example, in a group communication, the application server 30 that is a communication device managing a group may perform control of selecting either the unicast bearer 61 or the multicast bearer 62.

Figure 6:
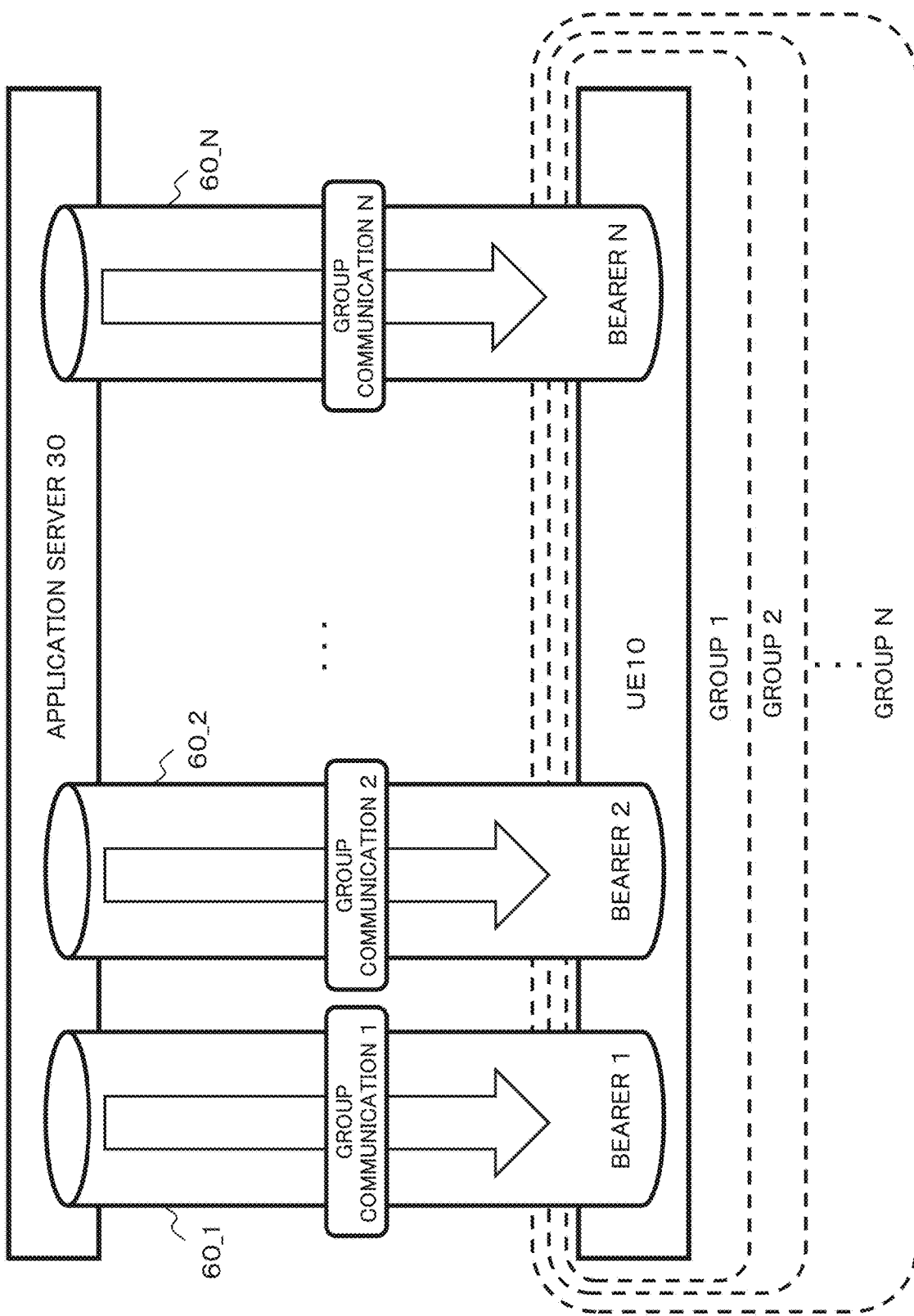
FIG. 6 shows one example of a bearer according to an exemplary example embodiment.

FIG. 6 illustrates one example of a bearer according to an exemplary example embodiment.

In FIG. 6, a relationship between a communication path (bearer) and a group communication is illustrated as an example. In this example, the mobile station 10 belongs to (is participating in) N groups. In this case, N bearers are established between the mobile station 10 and the application server 30. Further, in each bearer, one group communication is transmitted.

Suppose M mobile stations receive N group communications as many as the mobile station 10, M×N bearers are necessary in the case of the unicast bearer 61.

Meanwhile, in the case of the multicast bearer 62, and when a group communication is transmitted by multicast to M mobile stations, N bearers are necessary. In this case, the number of necessary bearers does not depend on the number of the mobile stations.

As described above, the number of bearers to be necessary differs depending on which one of the unicast bearer 61 and the multicast bearer 62 is used.

In the following example embodiments, examples will be described in which a wireless terminal included in at least one group performs a group communication using a voice (voice communication).

First Exemplary Example Embodiment

Figure 7:
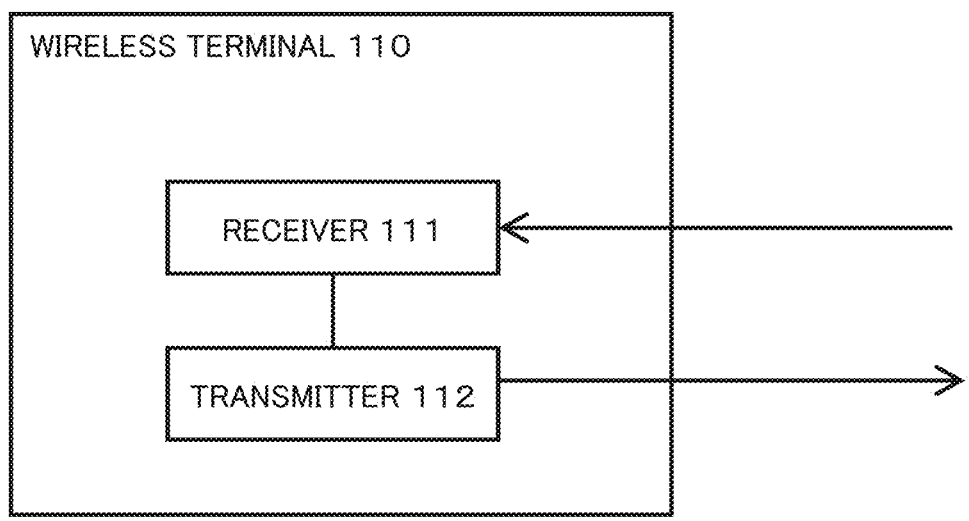
FIG. 7 shows a mobile station according to a first exemplary example embodiment.

FIG. 7 illustrates a mobile station (wireless terminal) according to a first exemplary example embodiment.

A wireless terminal (mobile station) 110 includes a receiver 111 and a transmitter 112.

The receiver 111 is configured to be capable of receiving, when the wireless terminal (mobile station 10) is included in at least one group, a voice communication relating to the at least one group.

Further, the transmitter 112 is configured to transmit, to a communication device (for example, an application server, a wireless terminal having a function equivalent to the application server, or the like) that controls the voice communication relating to the at least one group, volume information for determining volume on the voice communication relating to the at least one group.

Figure 8:
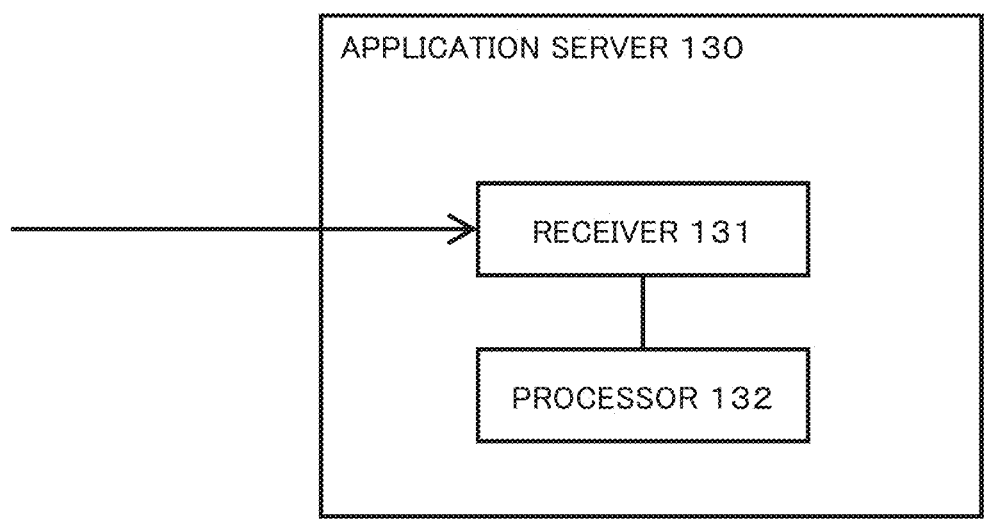
FIG. 8 shows an application server according to the first exemplary example embodiment.

FIG. 8 illustrates an application server according to the first exemplary example embodiment.

An application server 130 includes a receiver 131 and a processor 132.

The receiver 131 is configured to receive volume information for determining volume on a voice communication relating to at least one group.

The processor 132 is configured to determine volume, based on the volume information, and synthesize a voice of the voice communication relating to the at least one group, based on the determined volume.

Figure 9:
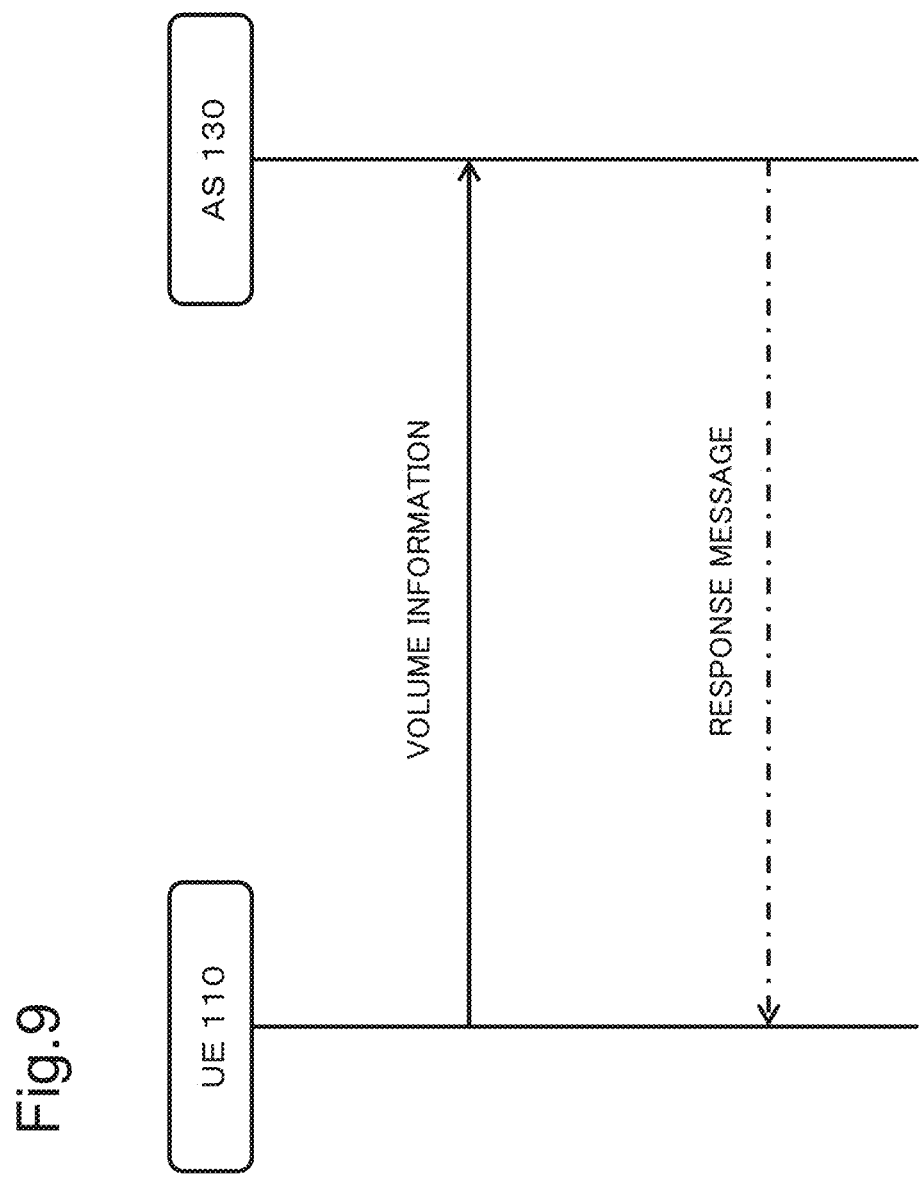
FIG. 9 shows one example of an operation according to the first exemplary example embodiment.

FIG. 9 illustrates one example of an operation according to the first exemplary example embodiment.

The transmitter 112 of the mobile station 110 transmits, to the application server 130, volume information for determining volume on a voice communication relating to at least one group. The receiver 131 of the application server 130 receives the volume information.

Note that, the application server 130 may transmit, in response to the volume information, a response message to the mobile station 110. The response message may include at least one of completion of reception of the volume information, information on the volume determined by the application server 130, information on whether or not it is possible to determine volume as requested by the mobile station 110, and the like.

Note that the application server 130 may include a not-illustrated memory. On the memory, the volume determined by the processor 132 may be registered. Information on volume already registered on the memory may be updated when the processor 132 determines new volume, based on volume information newly received by the receiver 131. The volume may be set or updated before a group communication is initiated or during a group communication.

Note that the application server 130 may not be provided in a high-order network. For example, the mobile station 110 having a function of the application server 130 may operate as a communication device that controls a voice communication relating to a group. In this case, volume information is transmitted to the mobile station 110 operating as the communication device.

Note that volume information to be transmitted by the mobile station 110 to the application server 130 (communication device) may be substantially the same as volume information (second volume information) to be stored in a memory (not illustrated) of the mobile station 110. Since volume information to be stored by the mobile station 110 and volume information to be received by the application server 130 are the same, the volume information can be shared between the mobile station 110 and the application server 130.

According to the first exemplary example embodiment, the mobile station 110 transmits, to the application server 130, volume information for determining volume on a voice communication relating to at least one group. Accordingly, the application server 130 is able to know the volume information. As a result, the volume information for determining volume on a voice communication relating to a group can be shared between the mobile station 110 and the application server 130. Recognition on the volume information can be made consistent between the mobile station 110 and the application server 130.

Figure 10:
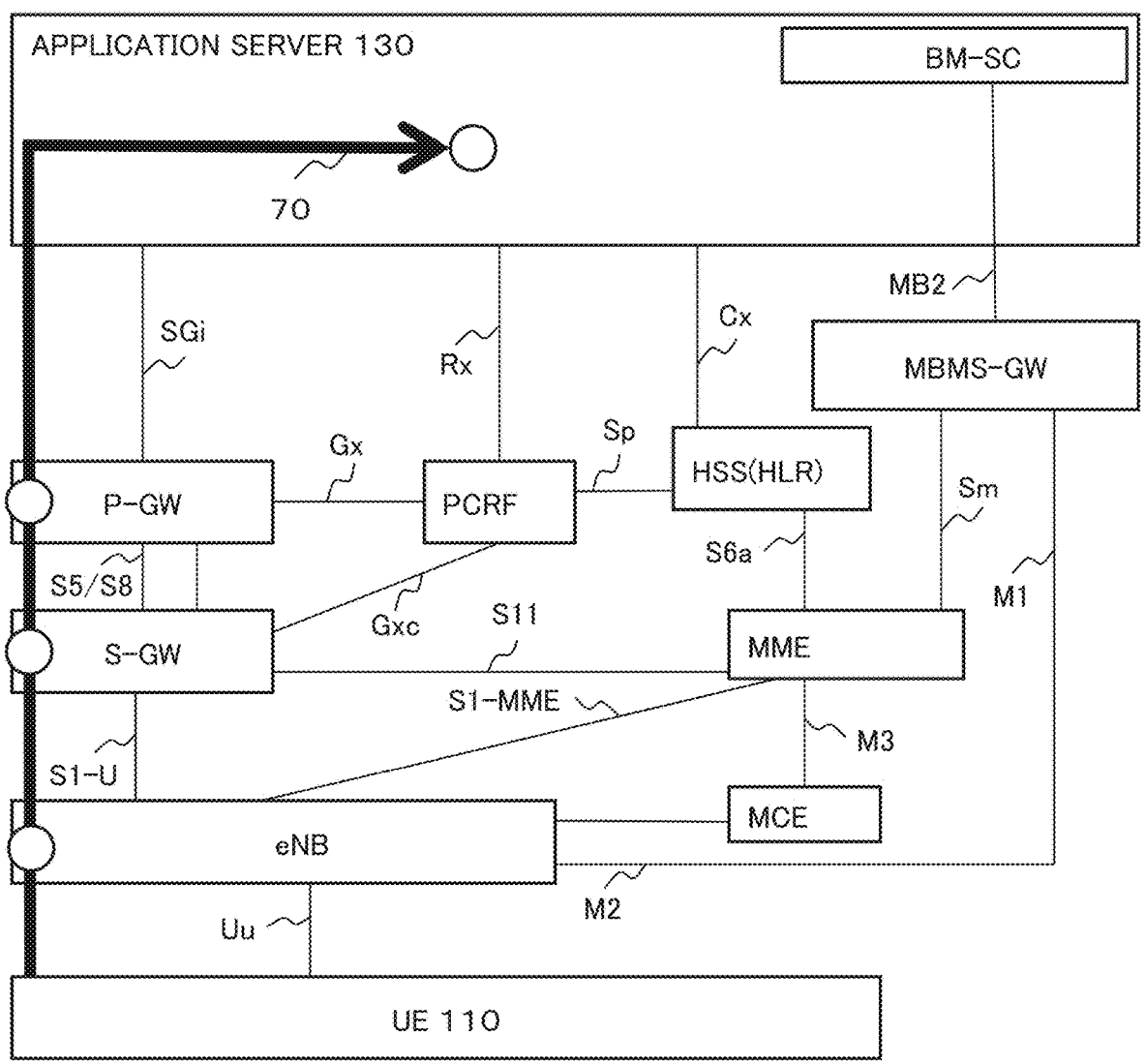
FIG. 10 shows one example of a notification method according to the first exemplary example embodiment.

FIG. 10 illustrates one example of a notification method associated with the first exemplary example embodiment.

The mobile station 110 may notify, through a unicast bearer 70, the application server 130 of volume information. Herein, the unicast bearer 70 is a communication path from the UE to the application server 130 via the eNB, the S-GW, and the P-GW.

Further, the volume information may include information on a synthesis ratio of volume of another voice communication to first volume of one voice communication included in a voice communication relating to at least one group.

Further, the volume information may include information indicating a volume level in first volume of one voice communication included in a voice communication relating to at least one group. In other words, a level of volume may be indicated as an absolute value. Meanwhile, a level of volume may be indicated as a relative value such as UP, DOWN, and KEEP.

Further, the volume information may include group identification information identifying a group. For example, it is assumed that a group ID relating to a first voice communication is "A", and information (a synthesis ratio or a volume level) on volume for this "A" may be indicated.

Further, the volume information may be transmitted with a certain condition as a trigger.

For example, when a fixed period of time has elapsed after transmission (notification) of previous volume information by the mobile station 110, volume information may be transmitted. Alternatively, when a predetermined time has come, the mobile station 110 may transmit volume information.

Further, for example, when the mobile station 110 desires to change volume of a group communication relating to a certain group, volume information may be transmitted. In this case, for example, the volume information may include at least one of identification information on a group requested for change by the mobile station 110, and information such as a volume level or a synthesis ratio requested for change. Further, there may be not only one but also a plurality of groups to be changed. In this case, information identifying groups requested for change and volume information associated therewith may be included.

Further, when the mobile station 110 is a wireless terminal with high authority among a group, configuration may be made in such a manner that only the mobile station 110 with high authority controls volume relating to a group communication. For example, as volume information, information representing that a terminal being a transmission source of the volume information has high authority may be included. Further, the mobile station 110 with low authority may include, in volume information, a request for changing only setting of a group to which the own station belongs.

Further, the mobile station 110 in a group communication may transmit volume information in the case of, for example, at least one of (1) to (3) below.

(1) When generating or receiving a call with high priority (such as an emergency call)

(2) When receiving a communication of a group number with high priority (3) When receiving from a user with high priority Further, the application server 130 determines volume by using the processor 132, based on volume information received from the mobile station 110 or volume determined by the application server 130 according to an emergency degree saved in advance, and synthesizes a voice of a voice communication relating to at least one group, based on the determined volume, in the case of, for example, at least one of (1) to (3) below.

(1) When receiving a call with high priority (such as an emergency call) from the mobile station 110

(2) When receiving a communication of a group number with high priority from the mobile station 110

(3) When receiving from a user with high priority from the mobile station 110

Second Exemplary Example Embodiment

Figure 11:
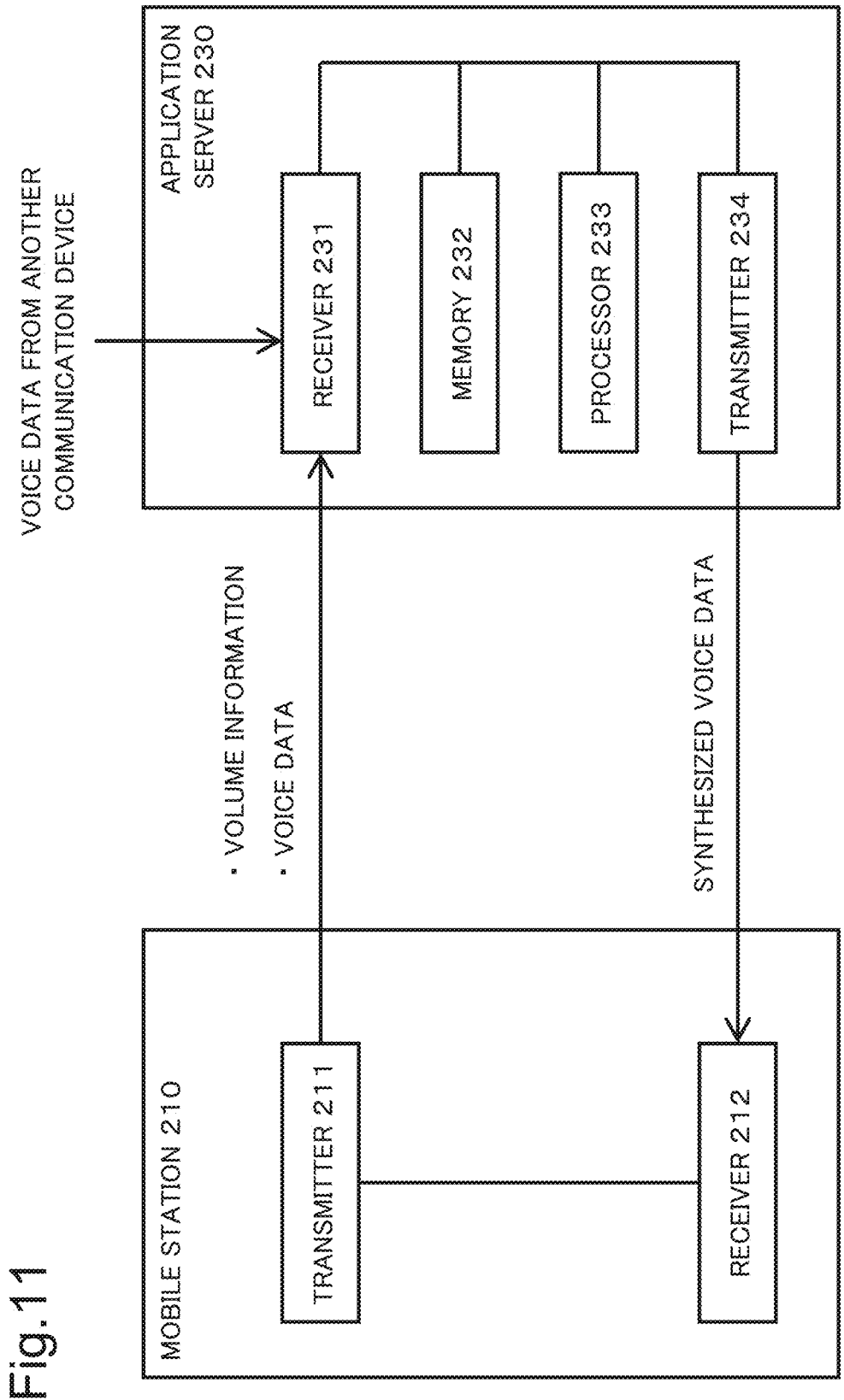
FIG. 11 shows one example of a mobile communication system according to a second exemplary example embodiment.

FIG. 11 illustrates one example of a mobile communication system according to a second exemplary example embodiment.

The mobile communication system according to the present example embodiment includes a mobile station 210 and an application server 230.

The mobile station 210 includes a transmitter 211 and a receiver 212.

The transmitter 211 is configured to transmit volume information for determining volume on a voice communication relating to at least one group, to the application server 230 being a communication device that controls the voice communication relating to the at least one group. Further, in the case of transmitting (in the case of having authority to transmit) voice data in a group to which the mobile station 210 belongs, the mobile station 210 transmits the voice data to the application server 230.

The receiver 212 is configured to be capable of receiving, when the wireless terminal (mobile station 10) is included in at least one group, voice data obtained by synthesizing a voice of a voice communication relating to the at least one group.

The application server 230 includes a receiver 231, a memory 232, a processor 233, and a transmitter 234.

The receiver 231 is configured to receive volume information and/or voice data for determining volume on a voice communication relating to at least one group. Note that, the receiver 231 is configured to receive voice data or volume information on a group managed by the application server 230, from another communication device (another mobile station, or a server and the like) other than the mobile station 210.

The memory 232 can store at least one of received volume information, received voice data, volume based on volume information determined by the processor 233, identification information on a group managed by the application server 230, identification information on a group and a mobile station included in the group, and information such as information on a group and a bearer to be used (which one of a unicast bearer and a multicast bearer is used).

The processor 233 is configured to determine volume, based on volume information received by the receiver 231 (or stored in the memory 232), and synthesize a voice of a voice communication relating to at least one group, based on the determined volume.

The transmitter 234 is configured to transmit voice data synthesized by the processor 233 to the mobile station 210.

Figure 12:
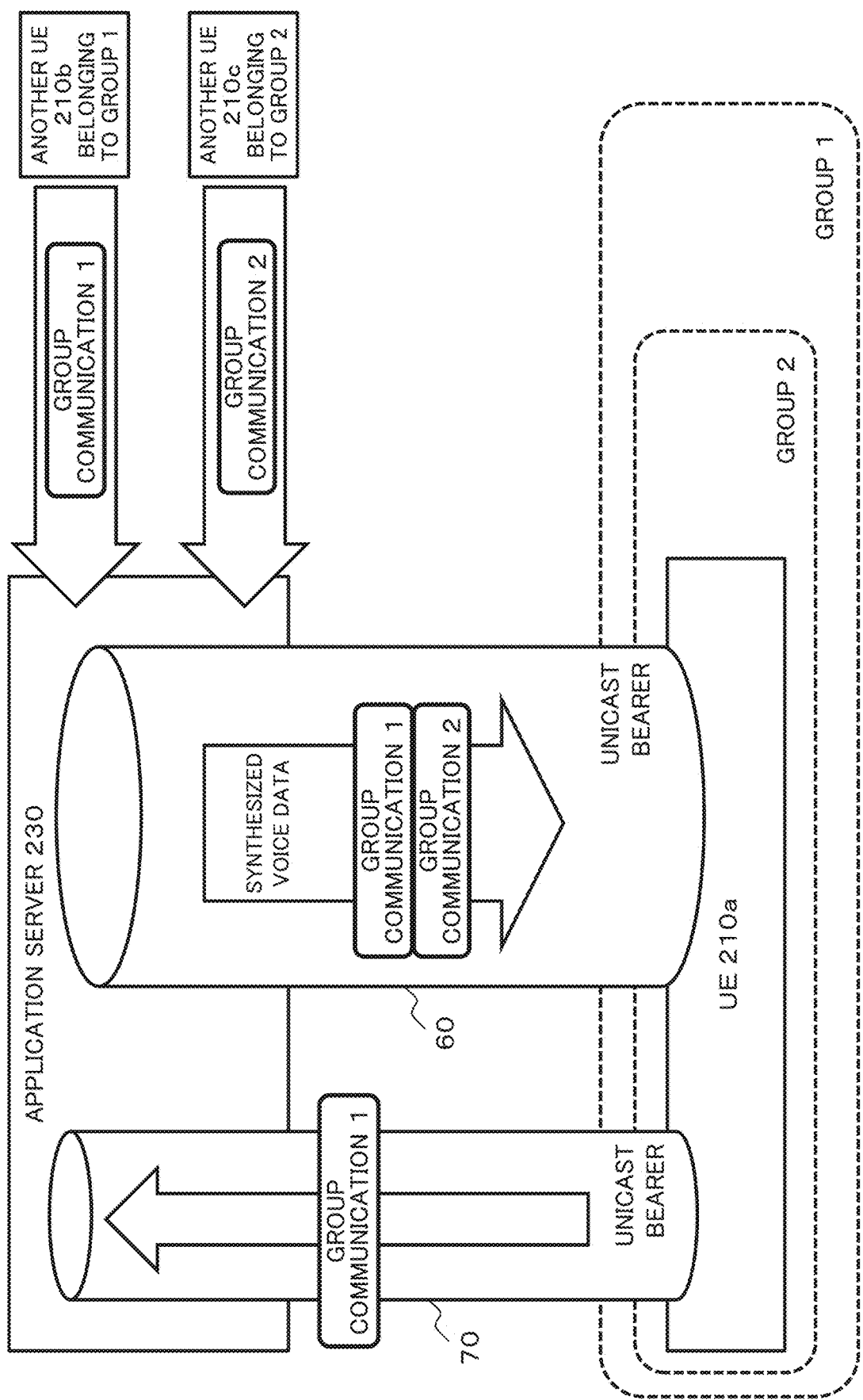
FIG. 12 shows one example of synthesis processing according to the second exemplary example embodiment.

FIG. 12 illustrates one example of synthesis processing according to the second exemplary example embodiment.

When a mobile station 210*a* has a transmission right in, for example, group 1, the transmitter 211 is able to transmit, in group 1, voice data on group communication 1 to the application server 230.

Meanwhile, when receiving voice data from another mobile station 210, the application server 230 synthesizes the voice data and transmits the synthesized voice data to the mobile station 210*a*. For example, the application server 230 receives voice data on group 1 from another mobile station 210*b* belonging to group 1, and receives voice data on group 2 from another mobile station 210*c* belonging to group 2. In this case, the application server 230 synthesizes the voice data on group communication 1 and the voice data on group communication 2, and transmits the synthesized voice data to the mobile station 210*a* by using a unicast bearer. Data addressed to the mobile station 210*a* are transmitted to the mobile stations 210 participating in (belonging to) group 1 and group 2, by using different unicast bearers. Note that, an example of a unicast bearer has been described herein, but, for example, a multicast bearer may be used. When a multicast bearer is used, all mobile stations receive a common synthesized voice. Thus, a synthesis ratio of a voice on group communication 1 and a voice on group communication 2 cannot be changed based on volume information received from the respective mobile stations. Thus, when a multicast bearer is used, a synthesis ratio of a voice on group communication 1 and a voice on group communication 2 may be set according to the same ratio, a ratio calculated from degrees of priority of group communication 1 and group communication 2, or a ratio set in advance for the application server 230.

According to the second exemplary example embodiment, a communication resource (in particular, a radio resource) can be effectively utilized, by transmitting a plurality of group communications by using a single bearer.

Third Exemplary Example Embodiment

Figure 13:
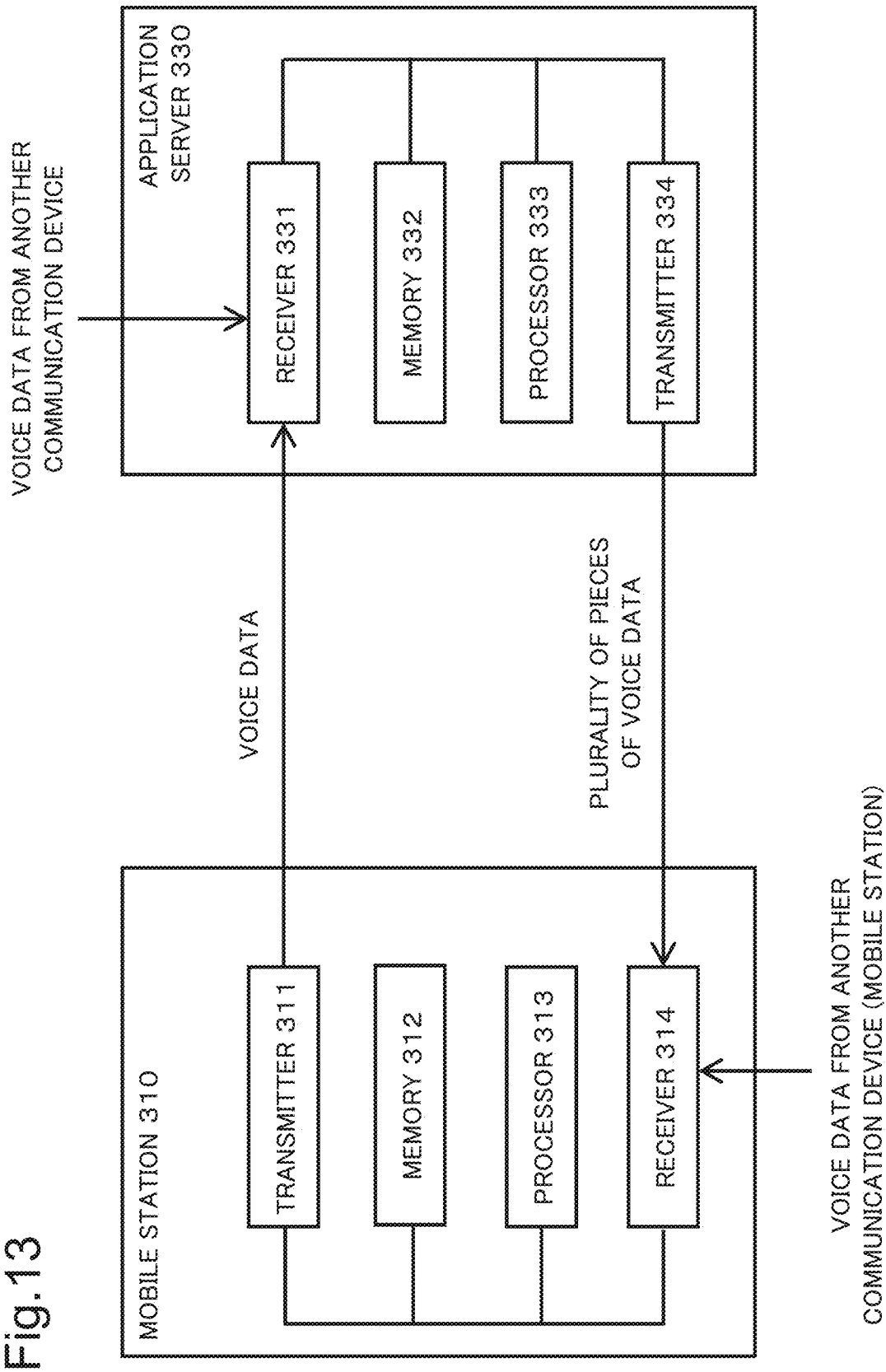
FIG. 13 shows one example of a mobile communication system according to a third exemplary example embodiment.

FIG. 13 illustrates one example of a mobile communication system according to a third exemplary example embodiment.

The mobile communication system according to the present example embodiment includes a mobile station 310 and an application server 330.

The mobile station 310 includes a transmitter 311, a memory 312, a processor 313, and a receiver 314.

When the transmitter 311 transmits voice data in a group to which the mobile station 310 belongs (in the case of having authority to transmit), the mobile station 310 transmits the voice data to the application server 330.

The memory 312 stores volume information for determining volume on a voice communication relating to at least one group.

The processor 313 is configured to synthesize, based on volume information stored in the memory 312, a voice of a voice communication relating to at least one group, from voice data to be received by the receiver 314.

The receiver 314 receives voice data on a voice communication relating to at least one group. In the case of the present example, a plurality of pieces of voice data are received. The plurality of pieces of voice data include, for example, first voice data on a first voice communication relating to a first group, second voice data on a second voice communication relating to a second group, . . . , and N-th voice data on an N-th voice communication relating to an N-th group (where N is an integer equal to or greater than two). The voice data may be transmitted from the application server 330, or may be transmitted from another communication device (mobile station 310).

The application server 330 includes a receiver 331, a memory 332, a processor 333, and a transmitter 334.

The receiver 331 is configured to receive voice data on a voice communication relating to at least one group. Note that, the receiver 331 is configured to receive voice data on a group managed by the application server 330, from another communication device (another mobile station, or a server and the like) other than the mobile station 310.

The memory 332 can store at least one of received voice data, identification information on a group managed by the application server 330, identification information on a group and a mobile station included in the group, and information such as information on a group and a bearer to be used (which one of a unicast bearer and a multicast bearer is used).

The processor 333 does not perform synthesis processing on a plurality of pieces of voice data received by the receiver 331 (or stored in the memory 332), but controls the transmitter 334 to perform transmission processing.

The transmitter 334 is configured to transmit, under control of the processor 333, a plurality of pieces of not-synthesized voice data received by the receiver 331 (or stored in the memory 332) to the mobile station 310.

Figure 14:
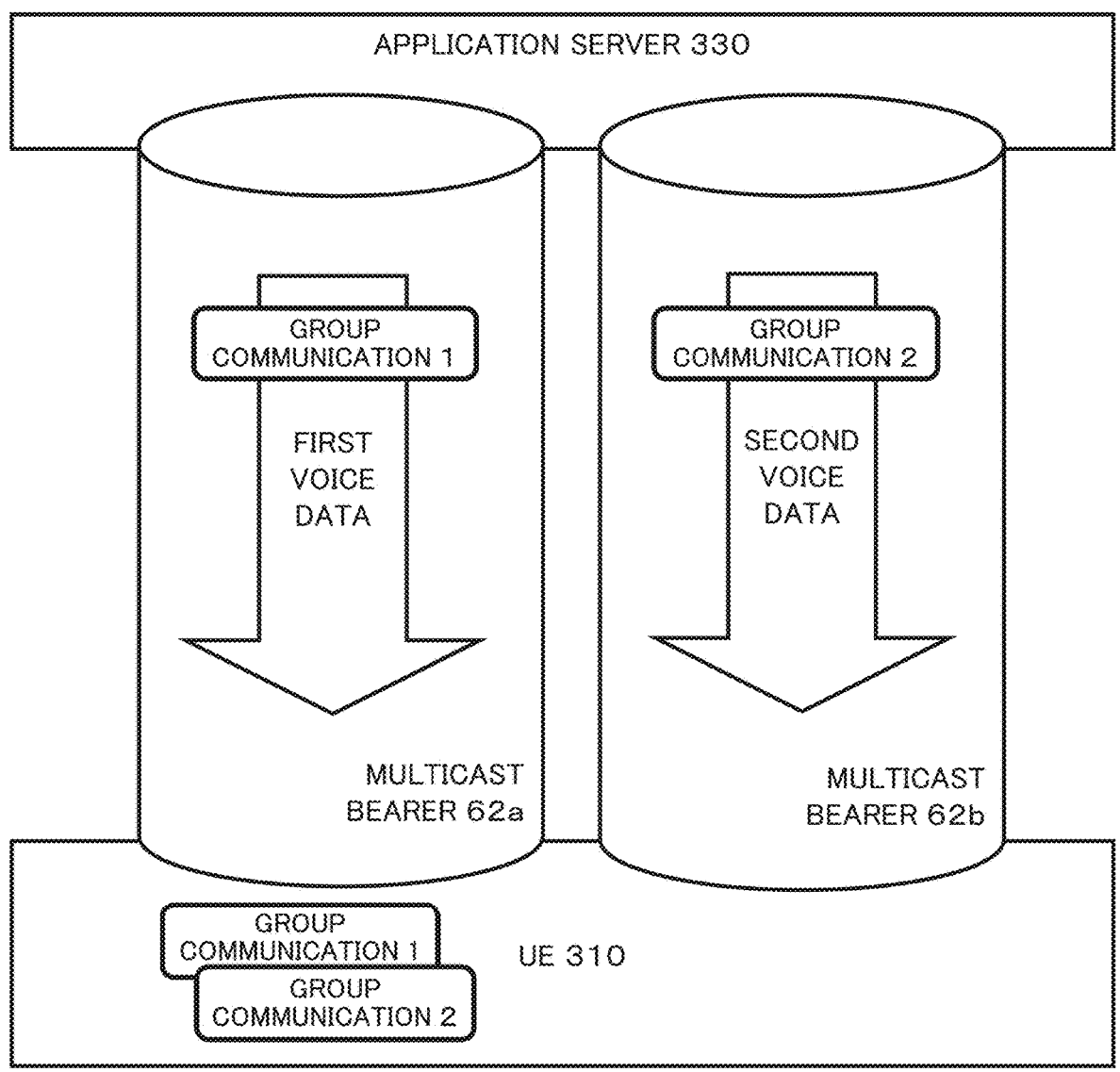
FIG. 14 shows one example of synthesis processing according to the third exemplary example embodiment.

FIG. 14 illustrates one example of synthesis processing according to the third exemplary example embodiment.

In the present example, the transmitter 334 of the application server 330 transmits a plurality of pieces of not-synthesized voice data (voice data on a group communication) to the mobile station 310 through a plurality of multicast bearers 62.

The mobile station 310 belongs to group 1 and group 2.

In a multicast bearer 62a, first voice data for group communication 1 on group 1 are transmitted from the transmitter 334 of the application server 330.

In a multicast bearer 62b, second voice data for group communication 2 on group 2 are transmitted from the transmitter 334 of the application server 330.

The receiver 314 of the mobile station 310 receives the first voice data and the second voice data.

The processor 313 of the mobile station 310 synthesizes the first voice data and the second voice data, based on volume information, stored in the memory 312, for determining volume on a voice communication relating to a group.

Figure 15:
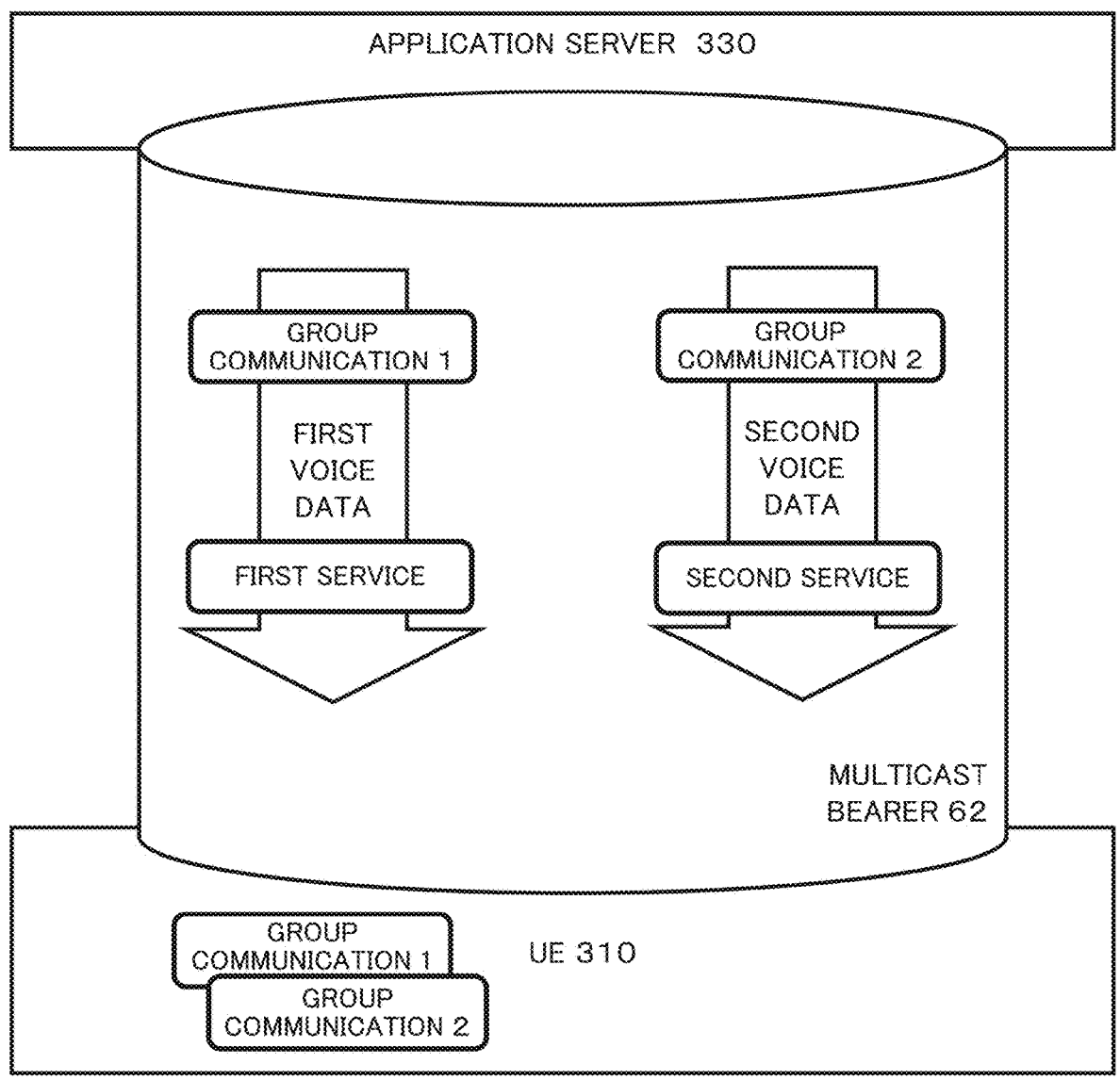
FIG. 15 shows one example of synthesis processing according to the third exemplary example embodiment.

FIG. 15 illustrates one example of synthesis processing according to the third exemplary example embodiment.

In the present example, the transmitter of the application server 330 transmits a plurality of pieces of not-synthesized voice data (voice data on a group communication) to the mobile station 310 through a single multicast bearer 62.

In the present example, the mobile station 310 belongs to group 1 and group 2.

In the single multicast bearer 62, first voice data for group communication 1 on group 1 and second voice data for group communication 2 on group 2 are transmitted.

In order to identify two pieces of voice data, the voice data in the present example include service identification information identifying a service. The first voice data are distinguished as a first service by first service identification information. Further, the second voice data are distinguished as a second service by second service identification information.

The receiver 314 of the mobile station 310 receives the first voice data and the second voice data through the single multicast bearer 62. Note that, service identification information and/or group identification information may be included in voice data, and the voice data may be identified based on these pieces of identification information.

The processor 313 of the mobile station 310 synthesizes the first voice data and the second voice data, based on volume information, stored in the memory 312, for determining volume on a voice communication relating to a group.

Note that, the service identification information identifying a service may be a temporary mobile group identity (TMGI), or may be a group identifier such as a group number identifying a group. Alternatively, the service identification information may be a pair of a TMGI and a group identifier identifying a group.

According to the example in FIG. 15, a plurality of group communications are transmitted by using the one multicast bearer 62 (common resource), and thus, a communication resource can be effectively utilized.

Figure 16:
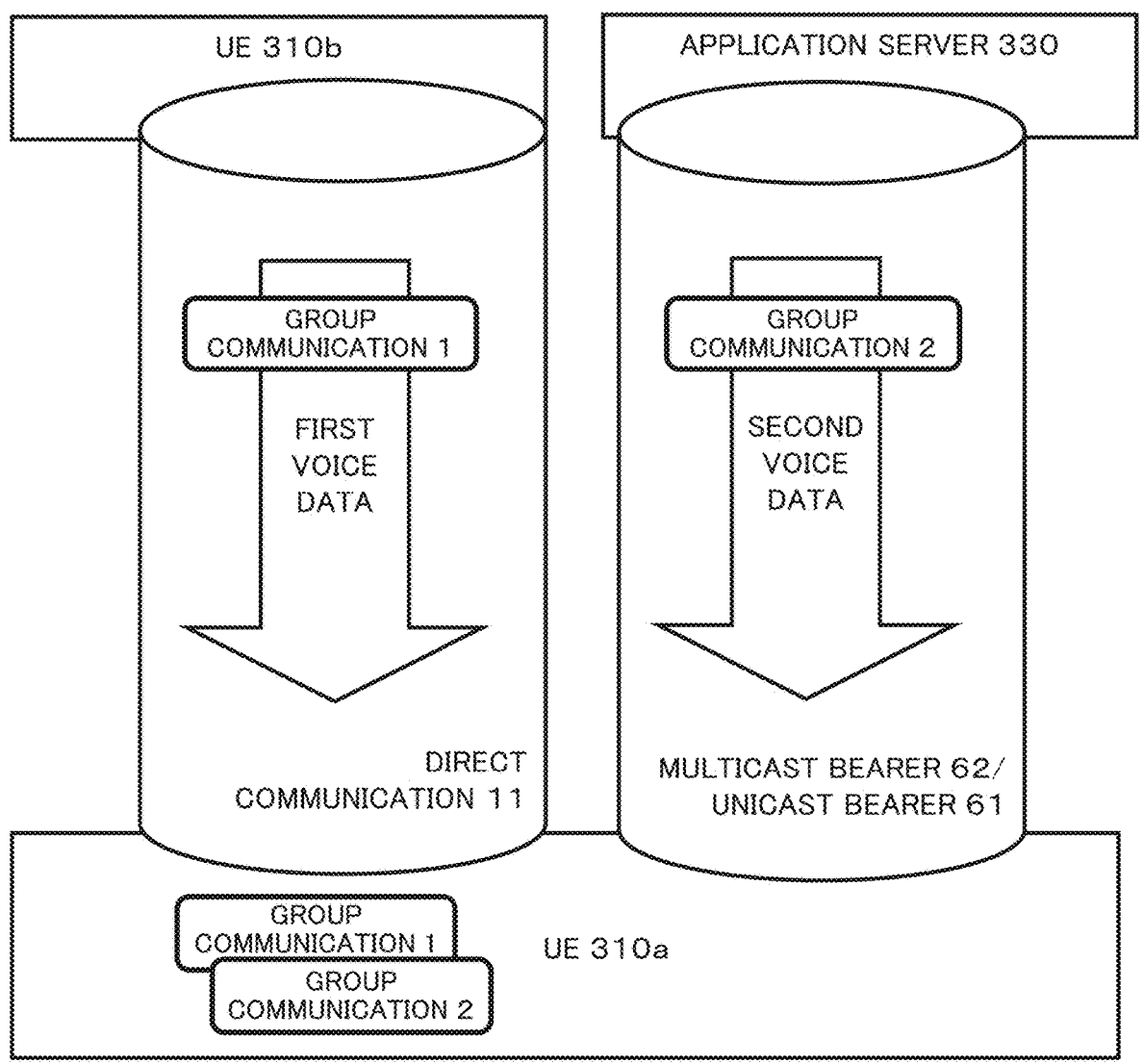
FIG. 16 shows one example of synthesis processing according to the third exemplary example embodiment.

FIG. 16 illustrates one example of synthesis processing according to the third exemplary example embodiment.

In the present example, the transmitter 334 of the application server 330 transmits not-synthesized voice data (voice data on a group communication) to a mobile station 310a through one bearer (the multicast bearer 62 or a unicast bearer 61).

Further, a mobile station 310b transmits not-synthesized voice data (voice data on a group communication) to the mobile station 310a by a direct communication 11 or a multi-hop communication, without through the application server 330.

The mobile station 310a belongs to group 1 and group 2.

In the direct communication 11, first voice data for group communication 1 on group 1 are transmitted from the transmitter 311 of the mobile station 310b.

In the multicast bearer 62 or the unicast bearer 61, second voice data for group communication 2 on group 2 are transmitted from the transmitter 334 of the application server 330.

The receiver 314 of the mobile station 310a receives the first voice data and the second voice data through the direct communication 11 and a bearer (the multicast bearer 62 or the unicast bearer 61).

The processor 313 of the mobile station 310a synthesizes the first voice data and the second voice data, based on volume information, stored in the memory 312, for determining volume on a voice communication relating to a group.

Figure 17:
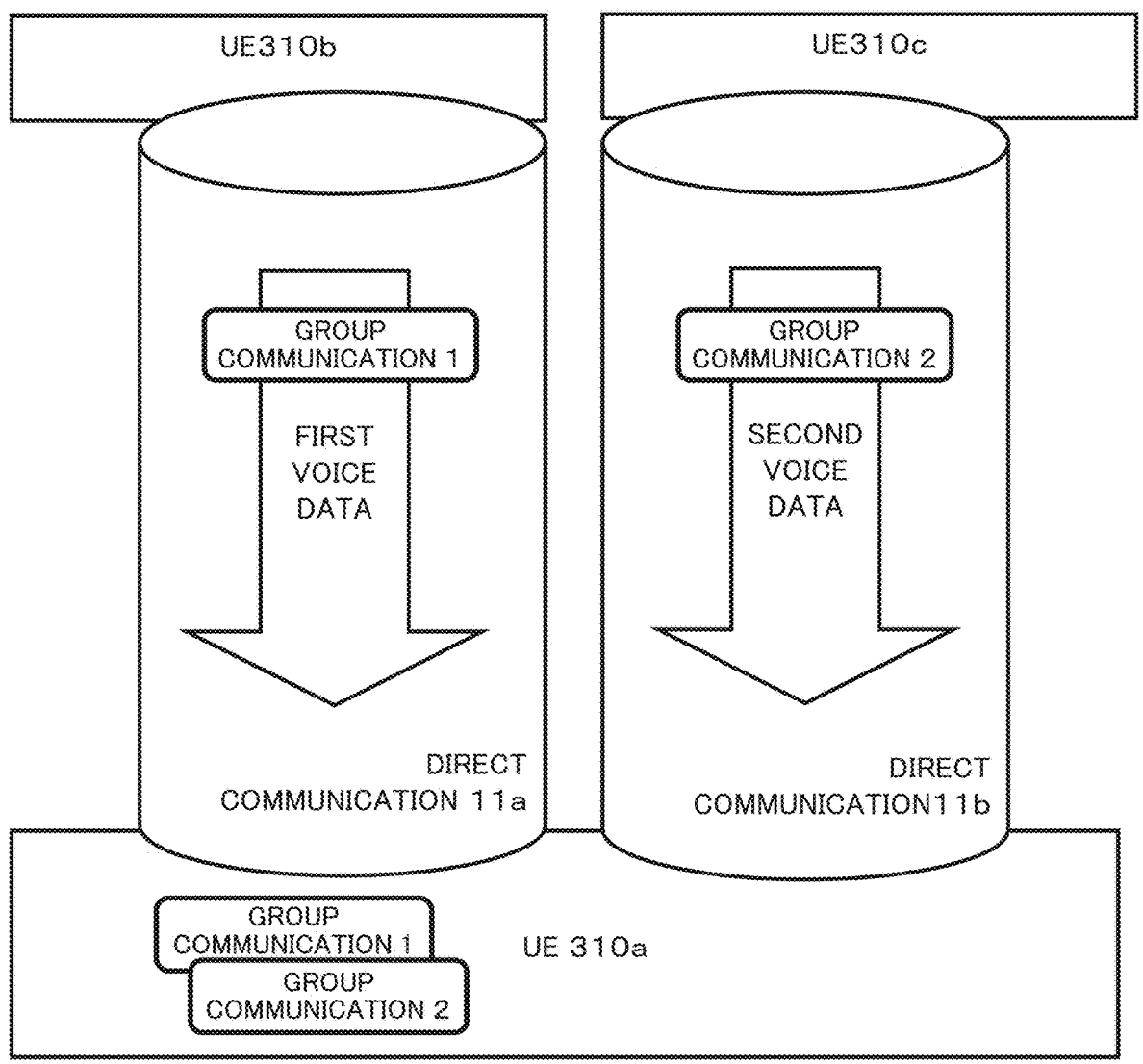
FIG. 17 shows one example of synthesis processing according to the third exemplary example embodiment.

FIG. 17 illustrates one example of synthesis processing according to the third exemplary example embodiment.

In the present example, the mobile station 310b transmits not-synthesized voice data (voice data on a group communication) to the mobile station 310a by the direct communication 11 or a multi-hop communication, without through the application server 330.

Further, a mobile station 310c transmits not-synthesized voice data (voice data on a group communication) to the mobile station 310a by the direct communication 11 or a multi-hop communication, without through the application server 330.

The mobile station 310a belongs to group 1 and group 2.

In a direct communication 11a, first voice data for group communication 1 on group 1 are transmitted from the transmitter 311 of the mobile station 310b.

In a direct communication 11b, second voice data for group communication 2 on group 2 are transmitted from the transmitter 311 of the mobile station 310c.

The receiver 314 of the mobile station 310a receives the first voice data and the second voice data through the direct communication 11a and the direct communication 11b.

The processor 313 of the mobile station 310a synthesizes the first voice data and the second voice data, based on volume information, stored in the memory 312, for determining volume on a voice communication relating to a group.

Note that, in the present example, the group communication may be managed by a not-illustrated application server. The group communication may be managed by the mobile station 310 (for example, any one of the mobile station 310a, the mobile station 310b, and the mobile station 310c) having a function equivalent to the application server.

Note that, in FIGS. 16 and 17, the direct communications 11 are illustrated as a direct communication between two mobile stations 310 for simplification of illustration. These direct communications 11 include a multi-hop communication.

According to the third exemplary example embodiment, voice data can be appropriately synthesized by a mobile station. For example, even when a communication path through which voice data are transmitted is changed (change of a bearer or use of a direct communication), a mobile station is able to synthesize a voice, based on information that the mobile station has.

Further, as in the first and second exemplary example embodiments, the mobile station 310 according to the present example embodiment may transmit volume information to another communication device. In this case, control is performed in such a manner that volume information stored in the memory 312 of the mobile station 310 coincides with volume information stored in a memory of the another communication device. In this case, volume information is shared between the mobile station and the another communication device, and thus, appropriate synthesis processing can be performed based on the shared volume information.

Fourth Exemplary Example Embodiment

Figure 18:
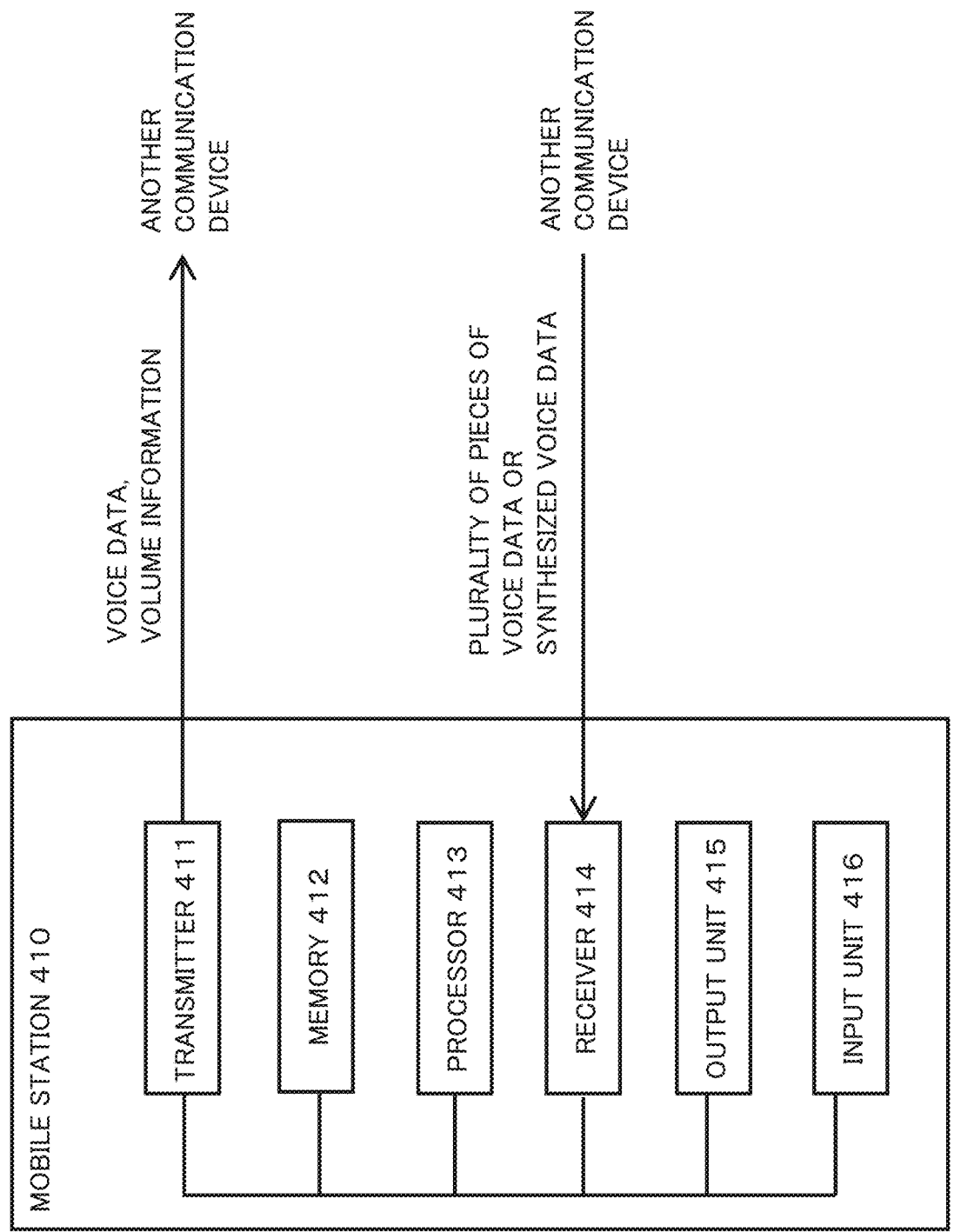
FIG. 18 shows one example of a mobile station according to a fourth exemplary example embodiment.

FIG. 18 illustrates one example of a mobile station according to a fourth exemplary example embodiment.

A mobile station 410 includes a transmitter 411, a memory 412, a processor 413, a receiver 414, an output unit 415, and an input unit 416.

The transmitter 411 is configured to transmit volume information for determining volume on a voice communication relating to at least one group, to a communication device (for example, an application server 430, or another mobile station 410 having a function equivalent to the application server) that controls the voice communication relating to the at least one group. Further, in the case of transmitting (in the case of having authority to transmit) voice data in a group to which the mobile station 410 belongs, the mobile station 410 transmits the voice data to another communication device.

The memory 412 stores volume information for determining volume on a voice communication relating to at least one group. The volume information is transmitted to another communication device by the transmitter 411. Note that, when the receiver 414 receives volume information from another communication device, volume information registered on the memory 412 may be updated to the received volume information.

The processor 413 controls each functional unit of the mobile station 410. Further, the processor 413 synthesizes voice data to be received by the receiver 414, a voice of a voice communication relating to at least one group, based on volume information stored in the memory 412.

The receiver 414 receives voice data on a voice communication relating to at least one group from another communication device. For example, the receiver 414 receives synthesized voice data or a plurality of pieces of voice data. The plurality of pieces of voice data include, for example, first voice data on a first voice communication relating to a first group, . . . , and N-th voice data on an N-th voice communication relating to an N-th group (where N is an integer equal to or greater than two). Further, the receiver 414 may receive volume information from another communication device.

The output unit 415 outputs voice data received and synthesized by the receiver 414, or voice data synthesized by the processor 413. The output unit 415 is, for example, a loudspeaker, headphones, earphones, and the like.

The input unit 416 is supplied with input information for changing volume included in volume information to be transmitted. Volume information is determined according to the input information, and the determined volume information is transmitted.

The input unit 416 receives input of external sound of the mobile station 410, converts the external sound into input data, and outputs the input data to the processor 413. In this case, the processor 413 may control the transmitter 411 to transmit voice data on the input data to a group to which the mobile station 410 belongs. The input unit 416 is, for example, a microphone.

Further, the input unit 416 may include an operation means that can be operated by a user. The operation means is operated when, for example, a user desires to make a request for a transmission right, and the like, and information associated with the operation is supplied to the processor 413 as input data. The processor 413 may be configured to make a request, to the application server 430 managing a group, for a transmission right according to the supplied input data.

Figure 19:
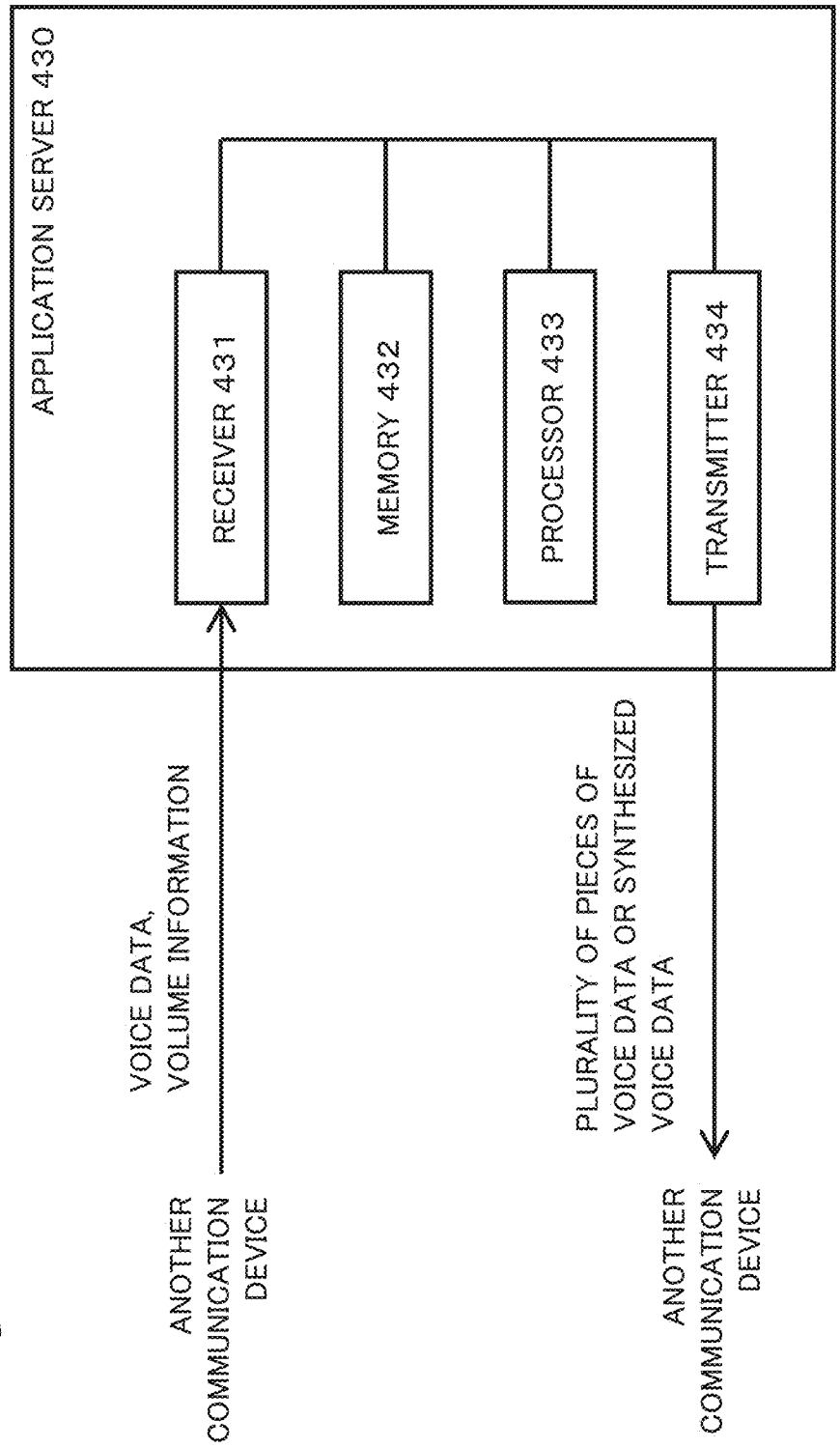
FIG. 19 shows one example of an application server according to the fourth exemplary example embodiment.

FIG. 19 illustrates one example of an application server according to the fourth exemplary example embodiment.

The application server 430 includes a receiver 431, a memory 432, a processor 433, and a transmitter 434.

The receiver 431 is configured to receive volume information and/or voice data for determining volume on a voice communication relating to at least one group. Note that the receiver 431 may receive voice data or volume information on a group managed by the application server 430, from another communication device (another mobile station, or a server and the like) other than the mobile station 410.

The memory 432 can store at least one of received volume information, received voice data, volume based on volume information determined by the processor 433, identification information on a group managed by the application server 430, identification information on a group and a mobile station included in the group, and information such as information on a group and a bearer to be used (which one of a unicast bearer and a multicast bearer is used).

The processor 433 is configured to determine volume, based on volume information received by the receiver 431 (or stored in the memory 432), and synthesize a voice of a voice communication relating to at least one group, based on the determined volume. When the processor 433 does not synthesize voice data, the processor 433 performs control in such a manner that a plurality of pieces of voice data received by the receiver 431 are transmitted from the transmitter 434.

The transmitter 434 is configured to transmit a plurality of pieces of voice data received by the receiver 431 or voice data synthesized by the processor 433 to another communication device (mobile station 410).

Figure 20:
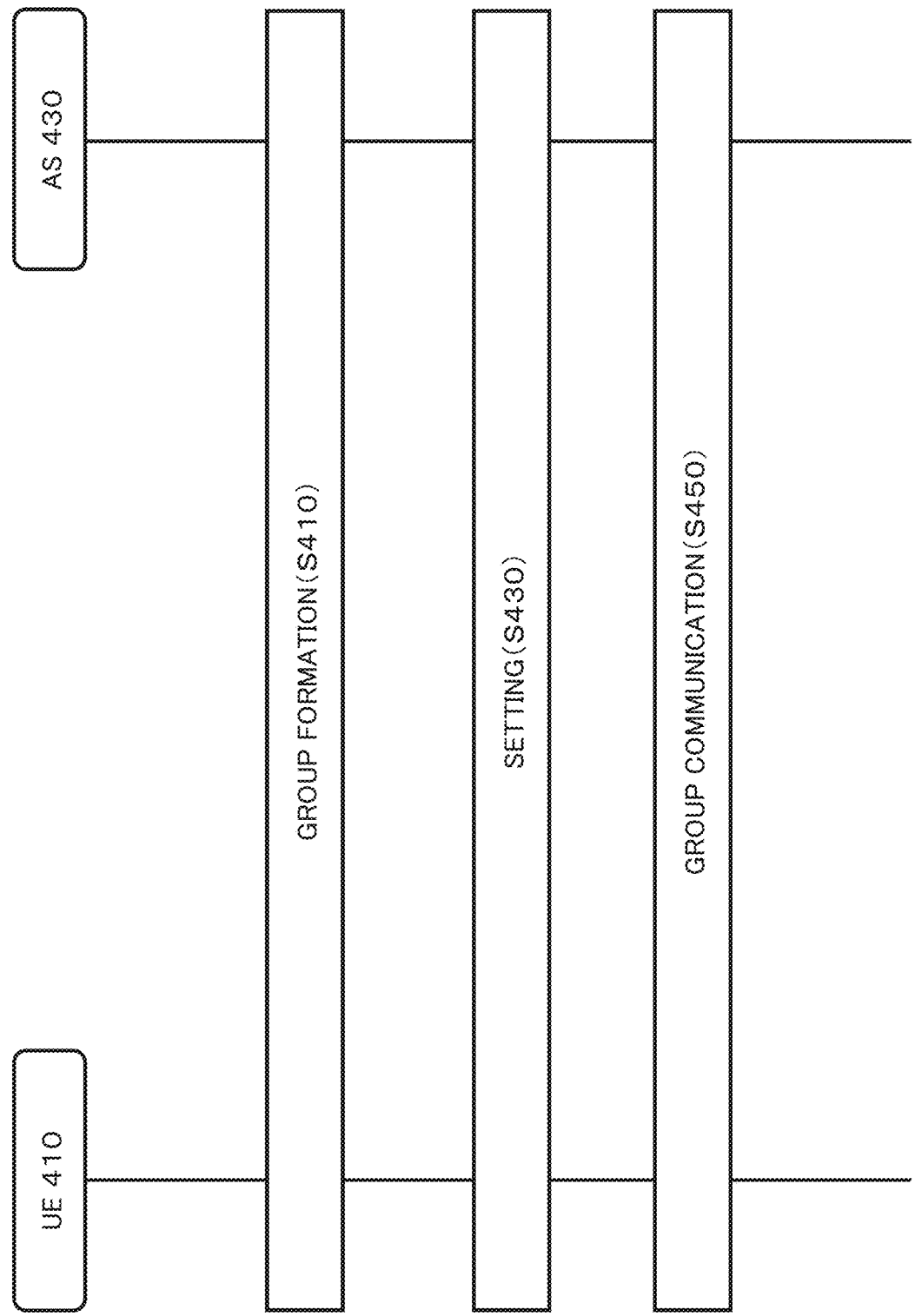
FIG. 20 shows one example of an operation according to the fourth exemplary example embodiment.

FIG. 20 illustrates one example of an overall operation according to the fourth exemplary example embodiment.

In S410, a group for a group communication is formed by the mobile station 410 and the application server 430.

In S430, various types of setting on the group communication are performed.

In S450, the group communication is executed.

Transmission of data of volume information in the above-described example embodiments may be performed in S430 (before the communication) or in S450 (during the communication).

Figure 21:
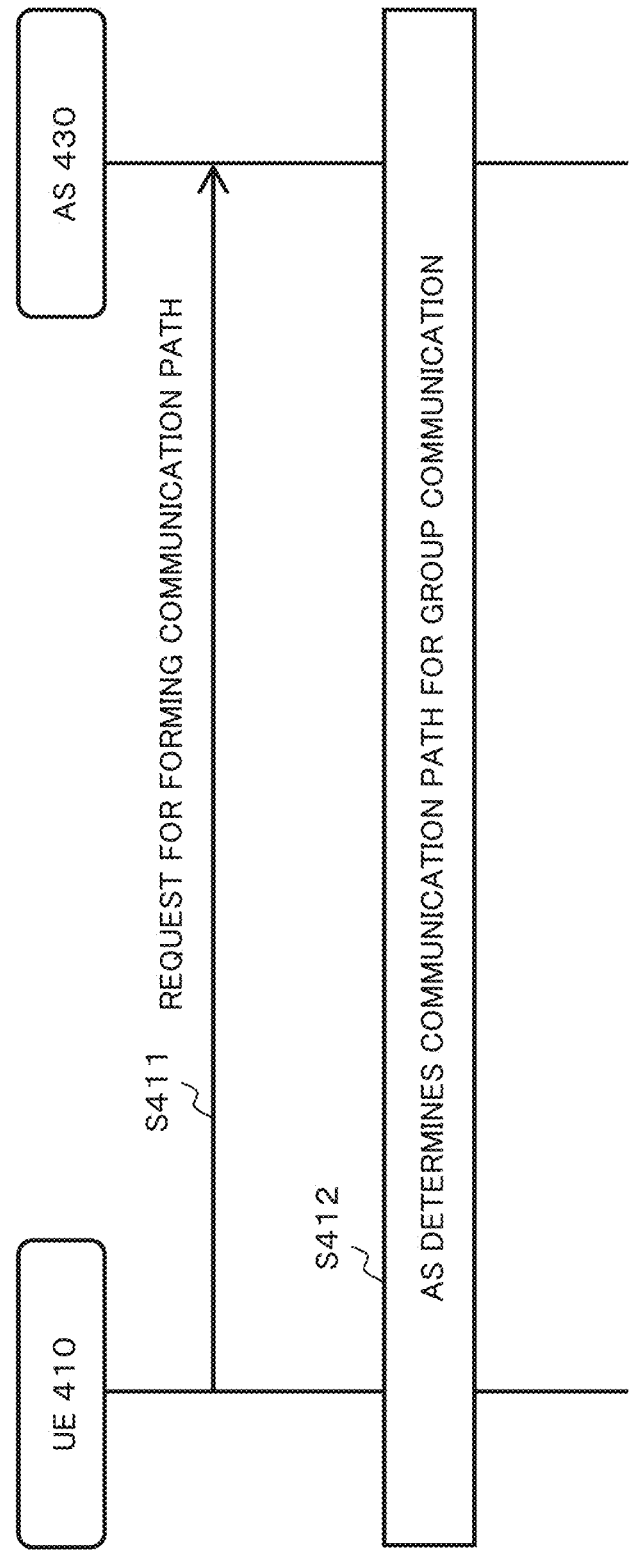
FIG. 21 shows operation 1 according to the fourth exemplary example embodiment.

FIG. 21 illustrates a specific example of S410 in FIG. 20.

In S411, the transmitter 411 of the mobile station 410 transmits a request for forming a communication path (a request for forming a group or a request for initiating a group communication) to the application server 430 managing a group communication. Note that the request may be a request for participating in an already formed group.

In S412, the application server 430 determines a communication path for a group communication. For example, the processor 433 of the application server 430 may form a communication path for a mobile station relating to a group communication.

FIG. 22 illustrates a specific example of S450 in FIG. 20.

In S451, when there are data to be transmitted to a group to which the mobile station 410 belongs, the transmitter 411 of the mobile station 410 transmits, to the application server 430, a request for acquiring a transmission right of transmission data.

In S452, the application server 430 allocates the transmission right to the mobile station 410.

In S453, the mobile station 410 acquires the transmission right.

FIG. 23 illustrates another specific example of S450 in FIG. 20.

In the present example, group 1 for a first group communication includes a mobile station 410a and a mobile station 410b. The application server 430 performs control (management) on a plurality of groups. Further, the application server 430 controls a group (for example, group 2) other than group 1.

In S430, volume information is exchanged and shared among the mobile station 410a, the application server 430, and the mobile station 410b.

In S453, the mobile station 410a acquires a transmission right.

In S454, the processor 413 of the mobile station 410a generates voice data for transmission within a group.

In S455, the transmitter 411 of the mobile station 410a transmits the generated voice data. The receiver 431 of the application server 430 receives the voice data. Note that the application server 430 receives voice data relating to another group from a mobile station 410c other than the mobile station 410a.

In S456, the processor 433 of the application server 430 determines whether or not to synthesize the received voice data, based on volume information stored in the memory 432.

In S457 (when NO in S456), the processor 433 of the application server 430 determines not to perform synthesis, and the transmitter 434 of the application server 430 transmits a plurality of pieces of voice data (for example, voice data from the mobile station 410a and voice data from the another mobile station 410c).

In S458, the mobile station 410 synthesizes the plurality of pieces of voice data. The synthesis is performed based on volume information stored in the memory 412 of the mobile station 410. The volume information is the volume information shared in S430.

In S459 (when YES in S456), the processor 433 of the application server 430 determines to perform synthesis. The processor 433 synthesizes a plurality of pieces of voice data (for example, voice data from the mobile station 410a and voice data from the another mobile station 410c), based on the volume information in the memory 432. The transmitter 434 transmits the synthesized data to the mobile station 410b.

In S460, the mobile station 410b outputs either the voice data synthesized by the application server 430 or the voice data synthesized by the mobile station 410b. For example, a synthesized voice is reproduced by a loudspeaker.

Fifth Exemplary Example Embodiment

FIG. 24 illustrates one example of a mobile communication system according to a fifth exemplary example embodiment.

The fifth exemplary example embodiment is relevant to a Third Generation Partnership Project (3GPP) standard.

The mobile communication system according to the present example embodiment includes a mobile station 510 and an application server 530. The mobile station 510 includes a mission-critical push-to-talk (MCPTT) client 511. The application server 530 includes an MCPTT server 531.

The MCPTT client 511 includes a media mixer 512.

The MCPTT server 531 includes a media distribution function 532.

The MCPTT client 511 transmits volume information described in the above-described example embodiments. The volume information is transmitted through an MCPTT interface between the MCPTT client 511 and the MCPTT server 531. The MCPTT interface is used for transmitting control information for MCPTT. The control information may be application-level information. The control information may include an MCPTT identifier (ID). The MCPTT ID may be, for example, an ID of the mobile station 510. Further, the control information may include an MCPTT group ID. The MCPTT group ID may be identification information (a group ID, a group number, and the like) identifying all groups receiving. For example, the control information may include N MCPTT group IDs and N pieces of volume information associated with the respective groups.

Note that the MCPTT interface is also referred to as an MCPTT-1 interface or a GC1 interface. The GC1 interface may be included in the MCPTT-1 interface.

The media distribution function 532 distributes media (for example, voice data) to the MCPTT client 511. For example, the media distribution function 532 can distribute media to the individual mobile station 510 by using a unicast bearer 61. Further, the media distribution function 532 can distribute media to a plurality of mobile stations 510 by using a multicast bearer 62.

The media distribution function 532 may synthesize, based on volume information received through the MCPTT interface, a plurality of media streams (a plurality of pieces of voice data) into one, and may transmit the synthesized one media stream to the mobile station 510. The media stream to be synthesized herein is not limited to voice data, but may be, for example, video data (for example, mission critical video (MCVideo)).

The media mixer 512 can synthesize a plurality of not-synthesized received media streams (a plurality of pieces of voice data) into one media stream, based on volume information that the MCPTT client 511 transmits to the MCPTT server 531.

Further, the MCPTT client 511 may further include a floor participant 513. Further, the MCPTT server 531 may further include a floor control server 533. The floor participant 513 and the floor control server 533 perform floor control.

The floor control is relevant to control of a transmission right. For example, push-to-talk (PTT) is a half-duplex communication, and thus, allows only one terminal (mobile station) within a group to transmit. The floor control is a function of adjustment regarding which terminal is given the transmission right.

When there are data that the mobile station 510 desires to transmit within a group, the mobile station 510 transmits a request for a transmission right to the floor control server 533. The floor control server 533 can determine whether to permit or reject the transmission right, and can transmit a result of determination to the floor participant 513 as response information.

Another Exemplary Example Embodiment (a) Sharing of Volume Information

Volume information (information indicating a synthesis ratio and the like of volume) may be shared between a mobile station and an application server. For example, the volume information may be shared at all times (or for a predetermined period of time), by installing application software (applications) for executing functions of respective configurations included in the mobile station and the application server and linking between the application of the mobile station and the application of the application server.

(b) Application to Public Safety (PS) Network

The above-described example embodiments are applicable to an existing public safety network. A firefighting system will be described as one example.

A plurality of group communications are performed in an area (formed by at least one cell) where a command vehicle of a fire station works. The command vehicle is provided with a mobile station (a mobile phone, a tablet terminal, and an in-vehicle device). These devices monitor the plurality of group communications.

For example, a first group communication (base station wave communication) in which a command console makes a call through an IMS and a base station, and a second group communication (direct wave communication) in which another communication device makes a call without through an IMS, a base station, and the like are monitored by the mobile station provided in the command vehicle.

When the command vehicle receives the first group communication and the second group communication, a voice is output from a loudspeaker, based on volume set for each group communication. For example, when the direct wave communication is more important, the volume for the second group communication is set to be larger than the volume for the first group communication.

As indicated in the above-described exemplary example embodiments, the command vehicle (mobile station) transmits volume information to an application server provided in the IMS. Based on the volume information, the application server synthesizes voices of the first group communication and the second group communication, and transmits the synthesized voices to the command vehicle. As a result, voices for the plurality of group communications according to volume information that the command vehicle (mobile station) desires can be reproduced.

(c) Selection and Switching of Communication Path (Bearer)

In the above, a mechanism of voice synthesis in an application server and a mechanism of voice synthesis in a mobile station have been described. Which one of the voice synthesis in the application server and the voice synthesis in the mobile station is to be performed may be determined by, for example, the application server, according to a type of a bearer to be used.

For example, when a unicast bearer 61 is used, the mobile station notifies the application server of volume information, and the application server synthesizes a voice at a notified ratio. Meanwhile, when a multicast bearer 62 is used, a synthesis ratio of a voice may be set in an application of the mobile station, and the voice may be synthesized at the ratio set in the application.

In this case, for example, an application of the application server may be linked with the application of the mobile station, and notification about which is to perform voice synthesis may be performed.

For example, even when a bearer to be used is changed, a user of the mobile station is able to reproduce voices for a plurality of group communications without being aware of the change, as long as volume information to be notified by the mobile station to the application server coincides with volume information to be used by the mobile station for synthesis.

Note that, when emergency information is generated in a particular group during a group communication, a mobile station included in the group may transmit, to an application server, volume information representing turning up of volume on the group communication and the emergency information indicative of emergency. Upon receiving the emergency information (information with high priority), the application server performs voice synthesis in consideration of the volume information on the group communication.

Note that a communication path (bearer) may be selected according to the number of UEs in a predetermined communication area (an area formed by at least one cell). For example, when there are a large number of UEs in the predetermined communication area, the application server selects a multicast bearer (common resource).

When there are a small number of UEs in the predetermined communication area, the application server selects a unicast bearer.

Note that, when bearers (unicast and multicast) of a communication for the same UE are switched, a subject to perform synthesis is switched from the UE to the application server or from the application server to the UE. According to the above-described example embodiments, since the UE and the application server share volume information, the UE is able to reproduce volume for a group communication at the same ratio, even when the subject to perform synthesis is switched.

The application server may hold a function of a group communication service entity (GCSE) standardized by the 3GPP, and the GCSE may select and switch bearers (unicast and multicast).

(d) The above-described example embodiments are described by using a half-duplex communication, like push-to-talk (PTT), as an example. The above-described example embodiments are not limited to the half-duplex communication, but may be a full-duplex communication.

(e) In the above, synthesis of "voice data" has been described, but synthesis of video data is also contemplated. In this case, a plurality of synthesized videos may be displayed on a plurality of displays of a mobile station or on a plurality of windows in a single display, and synthesized voice data may be reproduced.

(f) "Multicast" indicates at least one of multicast and broadcast.

(g) A "direct communication" includes a communication mode such that UEs having a relay function communicate with each other through a plurality of UEs (in the above, described as a multi-hop communication).

(h) In the above, processing performed by each component of the application server and the mobile station may be performed by a logic circuitry each manufactured according to a purpose.

(i) Further, a computer program (hereinafter, referred to as a program) describing processing contents as a procedure may be recorded on a recording medium that can be read by each of elements constituting the mobile communication system, and the program recorded on the recording medium may be read and executed by each component of the mobile communication system.

The program recorded on the recording medium is read by a central processing unit (CPU) provided in each component of the mobile communication system, and processing similar to that described above is performed by control of the CPU. Herein, the CPU operates as a computer that executes the program read from the recording medium on which the program is recorded.

In the above-described example, the program can be stored by using a non-transitory computer readable medium of various types, and can be supplied to the computer. The non-transitory computer readable medium includes a tangible recording medium (tangible storage medium) of various types. Examples of the non-transitory computer readable medium include a magnetic recording medium (for example, a flexible disk, a magnetic tape, and a hard disk drive), a magneto-optical recording medium (for example, a magneto-optical disk), a compact disc read only memory (CD-ROM), a CD-R, a CD-R/W, a digital versatile disk (DVD), and a semiconductor memory (for example, a mask ROM, a programmable ROM (PROM), an erasable PROM (EPROM), a flash ROM, and a random access memory (RAM)). Further, the program may be supplied to the computer by a transitory computer readable medium of various types. Examples of the transitory computer readable medium include an electrical signal, an optical signal, and an electromagnetic wave. The transitory computer readable medium can supply the program to the computer through a wired communication path such as an electrical wire and an optical fiber, or through a wireless communication path.

The present invention is not limited to only the above-described example embodiments. It is of course that various modifications can be made as far as such modifications do not depart from the gist of the present invention described already. The functions or steps and/or the operations according to the respective example embodiments described herein may not be executed in particular order. Furthermore, although elements of the present invention may be described or claimed in the singular, the plural is contemplated unless limitation to the singular is explicitly stated.

<Supplementary Notes>

Some or all of the above-described exemplary example embodiments can be described as the following supplementary notes. However, the following supplementary notes are merely for illustrative purpose of the present invention, and the present invention is not limited to such a case.

(Supplementary Note 1)

A wireless terminal comprising:

a receiver configured to be capable of receiving, when the wireless terminal is included in at least one group, a voice communication relating to the at least one group; and a transmitter configured to transmit, to a communication device that controls the voice communication relating to the at least one group, volume information for determining volume on the voice communication relating to the at least one group.

(Supplementary Note 2)

The wireless terminal according to supplementary note 1, wherein the volume information includes information on a synthesis ratio of volume of another voice communication to first volume of one voice communication included in the voice communication relating to the at least one group.

(Supplementary Note 3)

The wireless terminal according to supplementary note 2, wherein the volume information includes identification information identifying a group included in the at least one group.

(Supplementary Note 4)

The wireless terminal according to any one of supplementary notes 1 to 3, further comprising a memory, wherein second volume information to be stored in the memory is substantially same as the volume information to be transmitted to the communication device.

(Supplementary Note 5)

The wireless terminal according to any one of supplementary notes 1 to 4, further comprising a processor configured to synthesize, when the receiver receives a first voice communication relating to a first group and a second voice communication relating to a second group, a first voice on the first voice communication and a second voice on the second voice communication.

(Supplementary Note 6)

The wireless terminal according to supplementary note 5, wherein the first voice communication or the second voice communication is performed through a multicast bearer.

(Supplementary Note 7)

A server comprising:

a receiver configured to receive volume information for determining volume on a voice communication relating to at least one group; and a processor configured to determine volume, based on the volume information, and synthesize a voice of the voice communication relating to the at least one group, based on the determined volume.

(Supplementary Note 8)

The server according to supplementary note 7, further comprising a transmitter that transmits a voice synthesized by the processor to a wireless terminal through a unicast bearer.

(Supplementary Note 9)

The server according to supplementary note 7 or 8, wherein the volume information includes information on a synthesis ratio of volume of another voice communication to first volume of one voice communication included in the voice communication relating to the at least one group.

(Supplementary Note 10)

The server according to supplementary note 9, wherein the volume information includes identification information identifying a group included in the at least one group.

(Supplementary Note 11)

The server according to any one of supplementary notes 7 to 10, further comprising a memory, wherein second volume information to be stored in the memory is substantially same as the volume information to be received by the receiver.

(Supplementary Note 12)

A communication system comprising:

a wireless terminal; and a server, wherein the wireless terminal is configured to transmit, to the server, volume information for determining volume on a voice communication relating to at least one group, and the server is configured to receive the volume information for determining volume on the voice communication relating to the at least one group.

(Supplementary Note 13)

The communication system according to supplementary note 12, wherein the volume information includes information on a synthesis ratio of volume of another voice communication to first volume of one voice communication included in the voice communication relating to the at least one group.

(Supplementary Note 14)

The communication system according to supplementary note 13, wherein the volume information includes identification information identifying a group included in the at least one group.

(Supplementary Note 15)

The communication system according to any one of supplementary notes 12 to 14, wherein the wireless terminal and the server store the substantially same volume information.

(Supplementary Note 16)

The communication system according to any one of supplementary notes 12 to 15, wherein, when the server transmits, to the wireless terminal, a first voice communication relating to a first group and a second voice communication relating to a second group, the wireless terminal synthesizes a first voice on the first voice communication and a second voice on the second voice communication.

(Supplementary Note 17)

The communication system according to supplementary note 16, wherein the first voice communication or the second voice communication is performed through a multicast bearer.

(Supplementary Note 18)

The communication system according to supplementary note 12, wherein the server determines volume, based on the volume information, and synthesizes a voice of the voice communication relating to the at least one group, based on the determined volume.

(Supplementary Note 19)

The communication system according to supplementary note 18, wherein the synthesized voice is transmitted to the wireless terminal through a unicast bearer.

(Supplementary Note 20)

A communications method for a wireless terminal, comprising:

transmitting, when the wireless terminal is included in at least one group, volume information for determining volume on a voice communication relating to the at least one group, to a communication device that controls the voice communication relating to the at least one group; and receiving the voice communication relating to the at least one group.

(Supplementary Note 21)

The communications method according to supplementary note 20, wherein the volume information includes information on a synthesis ratio of volume of another voice communication to first volume of one voice communication included in the voice communication relating to the at least one group.

(Supplementary Note 22)

The communications method according to supplementary note 21, wherein the volume information includes identification information identifying a group included in the at least one group.

(Supplementary Note 23)

The communications method according to any one of supplementary notes 20 to 22, wherein second volume information to be stored in the wireless terminal is substantially same as the volume information to be transmitted to the communication device.

(Supplementary Note 24)

The communications method according to any one of supplementary notes 20 to 23, wherein, when the wireless terminal receives a first voice communication relating to a first group and a second voice communication relating to a second group, a first voice on the first voice communication and a second voice on the second voice communication are synthesized.

(Supplementary Note 25)

The communications method according to supplementary note 24, wherein the first voice communication or the second voice communication is performed through a multicast bearer.

(Supplementary Note 26)

A communications method for a server, comprising:

receiving volume information for determining volume on a voice communication relating to at least one group; and determining volume, based on the volume information, and synthesizing a voice of the voice communication relating to the at least one group, based on the determined volume.

(Supplementary Note 27)

The communications method for the server according to supplementary note 26, wherein the synthesized voice is transmitted to a wireless terminal through a unicast bearer.

(Supplementary Note 28)

The communications method for the server according to supplementary note 26 or 27, wherein the volume information includes information on a synthesis ratio of volume of another voice communication to first volume of one voice communication included in the voice communication relating to the at least one group.

(Supplementary Note 29)

The communications method for the server according to supplementary note 28, wherein the volume information includes identification information identifying a group included in the at least one group.

(Supplementary Note 30)

The communications method for the server according to any one of supplementary notes 26 to 29, wherein second volume information to be stored in the server is substantially same as the volume information to be received by the server.

(Supplementary Note 31)

A non-transitory computer-readable recording medium that records a program for causing a computer to execute:

transmitting, when a wireless terminal is included in at least one group, volume information for determining volume on a voice communication relating to the at least one group, to a communication device that controls the voice communication relating to the at least one group; and receiving voice communication relating to the at least one group.

(Supplementary Note 32)

The non-transitory computer-readable recording medium that records the program according to supplementary note 31, wherein the volume information includes information on a synthesis ratio of volume of another voice communication to first volume of one voice communication included in the voice communication relating to the at least one group.

(Supplementary Note 33)

The non-transitory computer-readable recording medium that records the program according to supplementary note 32, wherein the volume information includes identification information identifying a group included in the at least one group.

(Supplementary Note 34)

The non-transitory computer-readable recording medium that records the program according to any one of supplementary notes 31 to 33, wherein second volume information to be stored in the wireless terminal is substantially same as the volume information to be transmitted to the communication device.

(Supplementary Note 35)

The non-transitory computer-readable recording medium that records the program according to any one of supplementary notes 31 to 34, wherein, when the wireless terminal receives a first voice communication relating to a first group and a second voice communication relating to a second group, a first voice on the first voice communication and a second voice on the second voice communication are synthesized.

(Supplementary Note 36)

The non-transitory computer-readable recording medium that records the program according to supplementary note 35, wherein the first voice communication or the second voice communication is performed through a multicast bearer.

(Supplementary Note 37)

A non-transitory computer-readable recording medium that records a program for a server for causing a computer to execute:

receiving volume information for determining volume on a voice communication relating to at least one group; and determining volume, based on the volume information, and synthesizing a voice of the voice communication relating to the at least one group, based on the determined volume.

(Supplementary Note 38)

The non-transitory computer-readable recording medium that records the program for the server according to supplementary note 37, wherein the synthesized voice is transmitted to a wireless terminal through a unicast bearer.

(Supplementary Note 39)

The non-transitory computer-readable recording medium that records the program for the server according to supplementary note 37 or 38, wherein the volume information includes information on a synthesis ratio of volume of another voice communication to first volume of one voice communication included in the voice communication relating to the at least one group.

(Supplementary Note 40)

The non-transitory computer-readable recording medium that records the program for the server according to supplementary note 39, wherein the volume information includes identification information identifying a group included in the at least one group.

(Supplementary Note 41)

The non-transitory computer-readable recording medium that records the program for the server according to any one of supplementary notes 37 to 40, wherein second volume information to be stored in the server is substantially same as the volume information to be received by the server.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

REFERENCE SIGNS LIST

10 Mobile station
20 Base station
21 Cell
30 Application server
40 Command console
50 Group
61 Unicast bearer
62 Multicast bearer
70 Unicast bearer
110 Mobile station
111 Receiver
112 Transmitter
130 Application server
131 Receiver
132 Processor
210 Mobile station
211 Transmitter
212 Receiver
230 Application server
231 Receiver
232 Memory
233 Processor
234 Transmitter
310 Mobile station
311 Transmitter
312 Memory
313 Processor
314 Receiver
330 Application server
331 Receiver 332 Memory
333 Processor
334 Transmitter
410 Mobile station
411 Transmitter
412 Memory
413 Processor
414 Receiver
415 Output unit
416 Input unit
430 Application server
431 Receiver
432 Memory
433 Processor
434 Transmitter
510 Mobile station
511 MCPTT client
512 Media mixer
513 Floor participant
530 Application server
531 MCPTT server
532 Media distribution function
533 Floor control server

The invention claimed is:

1. A wireless terminal comprising:
a transmitter configured to transmit, when the wireless terminal is included in a plurality of groups, to a communication device that controls a voice communication relating to the plurality of groups, volume information for determining volume on the voice communication relating to the plurality of groups;
a receiver configured to be capable of receiving, from the communication device, a plurality of pieces of voice data on the voice communication relating to the plurality of groups and a synthesized data which is synthesized the plurality of pieces of voice data based on the volume information; and
a processor configured to synthesize, when the receiver receives the plurality of pieces of voice data, the plurality of pieces of voice data based on the volume information,
wherein said volume information includes a volume level of another voice communication.

2. The wireless terminal according to claim 1, wherein the volume information includes information on a synthesis ratio of volume of another voice communication to first volume of one voice communication included in the voice communication relating to the plurality of groups.

3. The wireless terminal according to claim 2, wherein the volume information includes identification information identifying each group included in the plurality of groups.

4. The wireless terminal according to claim 1, further comprising a memory, wherein
the volume information to be stored in the memory is the same as the volume information to be transmitted to the communication device, and
the processor synthesizes the plurality of pieces of voice data based on the volume information to be stored in the memory.

5. The wireless terminal according to claim 1, wherein the voice communication relating to the plurality of groups is performed through a multicast bearer, when the receiver receives the plurality of pieces of voice data.

6. A server comprising:
a receiver configured to receive volume information for determining volume on a voice communication relating to a plurality of groups;
a processor configured to determine whether or not to synthesize a plurality of pieces of voice data on the voice communication relating to the plurality of groups, when it is determined to synthesize the pieces of voice data, determine volume, based on the volume information, and synthesize the plurality of pieces of voice data of the voice communication relating to the plurality of groups, based on the determined volume; and
a transmitter configured to transmit the plurality of pieces of voice data to a wireless terminal having the volume information when it is determined not to synthesize, and transmit a synthesized data which is synthesized the plurality of pieces of voice data to the wireless terminal when it is determined to synthesize,
wherein said volume information includes a volume level of another voice communication.

7. The server according to claim 6, wherein the transmitter that transmits the synthesized data to the wireless terminal through a unicast bearer.

8. The server according to claim 6, wherein the volume information includes information on a synthesis ratio of volume of another voice communication to first volume of one voice communication included in the voice communication relating to the plurality of groups.

9. The server according to claim 8, wherein the volume information includes identification information identifying each group included in the plurality of groups.

10. The server according to claim 6, further comprising a memory, wherein
the volume information to be stored in the memory is the same as the volume information to be received by the receiver, and
the processor synthesizes the plurality of pieces of voice data based on the volume information to be stored in the memory.

11. A communications method for a wireless terminal, comprising:
transmitting, when the wireless terminal is included in a plurality of groups, volume information for determining volume on a voice communication relating to the plurality of groups, to a communication device that controls the voice communication relating to the plurality of groups;
receiving, from the communication device, a plurality of pieces of voice data on the voice communication relating to the plurality of groups and a synthesized data which is synthesized the plurality of pieces of voice data based on the volume information; and
synthesizing, when the receiver receives the plurality of pieces of voice data, the plurality of pieces of voice data based on the volume information,
wherein said volume information includes a volume level of another voice communication.

12. The communications method according to claim 11, wherein
the volume information includes information on a synthesis ratio of volume of another voice communication to first volume of one voice communication included in the voice communication relating to the plurality of groups.

13. The communications method according to claim 12, wherein
 the volume information includes identification information identifying each group included in the plurality of groups.

14. The communications method according to claim 11, wherein
 the volume information to be stored in the wireless terminal is the same as the volume information to be transmitted to the communication device.

15. The communications method according to claim 11, wherein
 the voice communication relating to the plurality of groups is performed through a multicast bearer, when the wireless terminal receives the plurality of pieces of voice data.

\* \* \* \* \*